(12) United States Patent
Salapaka et al.

(10) Patent No.: US 7,627,438 B1
(45) Date of Patent: Dec. 1, 2009

(54) OBSERVER BASED Q-CONTROL IMAGING METHODS FOR ATOMIC FORCE MICROSCOPY

(75) Inventors: Murti V. Salapaka, Ames, IA (US); Deepak Ranjan Sahoo, Horgen (CH)

(73) Assignee: Iowa State University Research Foundation, Inc., Ames, IA (US)

( * ) Notice: Subject to any disclaimer, the term of this patent is extended or adjusted under 35 U.S.C. 154(b) by 83 days.

(21) Appl. No.: 11/796,205

(22) Filed: Apr. 27, 2007

Related U.S. Application Data

(60) Provisional application No. 60/745,968, filed on Apr. 28, 2006.

(51) Int. Cl.
*G01B 11/00* (2006.01)
*G06F 17/00* (2006.01)

(52) U.S. Cl. ............... 702/28; 702/127; 702/189; 73/105

(58) Field of Classification Search ............ 702/133, 702/28, 127
See application file for complete search history.

(56) References Cited

U.S. PATENT DOCUMENTS

| 5,383,354 | A | * | 1/1995 | Doris et al. .............. 73/105 |
| 5,517,128 | A | * | 5/1996 | Henninger ................ 324/765 |
| 7,066,014 | B2 | | 6/2006 | Salapaka et al. |
| 7,289,906 | B2 | * | 10/2007 | van der Merwe et al. ... 701/214 |
| 7,313,948 | B2 | | 1/2008 | Salapaka et al. |
| 7,360,405 | B2 | | 4/2008 | Salapaka et al. |
| 2005/0066713 | A1 | * | 3/2005 | Salapaka et al. .......... 73/105 |

OTHER PUBLICATIONS

Javier Tamayo et al., Piconewton regime dynamic force microscopy in liquid, paper, Jul. 24, 2000, 3 pages, vol. 77, No. 4.
F. Ohnesorge et al., True Atomic Resolution by Atomic Force Microscopy Through Repulsive and Attractive Forces, paper, Jun. 4, 1993, 6 pages, pp. 1451-1456, vol. 260.
P. K. Hansma et al., Tapping mode atomic force microscopy in liquids, paper, Mar. 28, 1994, 3 pages, pp. 1738-1740, Appl. Phys. Lett. 64 (13).
Constant A. J. Putman, Tapping mode atomic force microscopy in liquid, paper, May 2, 1994, 3 pages, pp. 2454-2456, Appl. Phys Lett. 64 (18).

(Continued)

*Primary Examiner*—Hal D Wachsman
(74) *Attorney, Agent, or Firm*—Reinhart Boerner Van Deuren P.C.

(57) ABSTRACT

An observer based Q control method for a cantilever in an atomic force microscopy is provided that provides for a "dual" Q behavior such that a particular effective Q is achieved when a sample is present and another effective Q when a sample is absent. In the control method, the transfer function from dither input to photo-diode output is independent of the observer so that the cantilever effectively behaves like a spring-mass-damper system. The effective quality factor and stiffness of the cantilever can be changed by appropriately choosing the state feedback gain. The method provides sample-imaging using transient atomic force microscopy.

13 Claims, 23 Drawing Sheets
(8 of 23 Drawing Sheet(s) Filed in Color)

OTHER PUBLICATIONS

Rainer D. Jäggi et al., Detailed analysis of forces influencing lateral resolution for Q-Control and tapping mode, paper, Jul. 2, 2001, 3 pages, pp. 135-137, vol. 79, No. 1.

Deepak R. Sahoo et al., Transient-signal-based sample detection in atomic force microscopy, paper, Dec. 29, 2003, 3 pages, pp. 5521-5523, vol. 83, No. 26.

Tomás R. Rodriquez et. al., Theory of Q control in atomic force microscopy, paper, Jun. 30, 2003, 3 pages, pp. 4821-4823, vol. 82, No. 26.

G. Binnig et al.; Atomic Force Microscope; publication; Mar. 3, 1986; 5 pages, pp. 930-933 plus FIG.1; vol. 56, No. 9; Physical Review Letters.

Jan H. Hoh et al.; Atomic Force Microscopy and Dissection of Gap Junctions; publication; Sep. 20, 1991; 4 pages, pp. 1405-1408; vol. 253; Science Reports.

Sandor Kasas et al.; *Escherichia coli* RNA Polymerase Activity Observed Using Atomic Force Microscopy; publication; Jan. 21, 1997; 8 pages, pp. 461-468; vol. 36, No. 3; Biochemistry.

D.A. Walters et al.; Short cantilevers for atomic force microscopy; publication; Oct. 1996; 8 pages, pp. 3583-3590; vol. 67, No. 10; Rev. Sci. Instrum.

Toshio Ando et al.; A high-speed atomic force microscope for studying biological macromolecules; publication; Oct. 23, 2001; 5 pages, pp. 12468-12472; vol. 98, No. 22; PNAS.

T. Sulchek et al.; High-speed tapping mode imaging with active $Q$ control for atomic force microscopy; publication; Mar. 13, 2000; 3 pages, pp. 1473-1475; vol. 76, No. 11; Applied Physics Letters.

A.D.L. Humphris et al.; A mechanical microscope: High-speed atomic force microscopy; publication; 4 pages, pp. 034106-1-034106-3 (and copyright notice); Applied Physics Letters 86, Jan. 14, 2005.

P. Vettiger et al.; The "Millipede"-Nanotechnology Entering Data Storage; publication; Mar. 2002; 17 pages, pp. 39-55; vol. 1, No. 1; IEEE Transactions on Nanotechnology.

Deepak R. Sahoo et al.; Transient-signal-based sample-detection in atomic force microscopy; publication; Dec. 29, 2003; 4 pages, pp. 5521-5523 (and copyright notice); vol. 83, No. 26; Applied Physics Letters.

Deepak R. Sahoo et al.; Harnessing the transient signals in atomic force microscopy; publication; Jul. 22, 2005; 16 pages, pp. 805-820; vol. 15; International Journal of Robust and Nonlinear Control.

M.V. Salapaka et al.; Multi-mode noise analysis of cantilevers fro scanning probe microscopy; publication; Mar. 15, 1997; 8 pages, pp. 2480-2487; vol. 81, No. 8; J. Appl. Phys.

Alan S. Willsky et al.; A Generalized Likelihood Ration Approach to the Detection and Estimation of Jumps in Linear Systems; publication; Feb. 1976; 5 pages, pp. 108-112; IEEE Transactions on Automatic Control.

\* cited by examiner

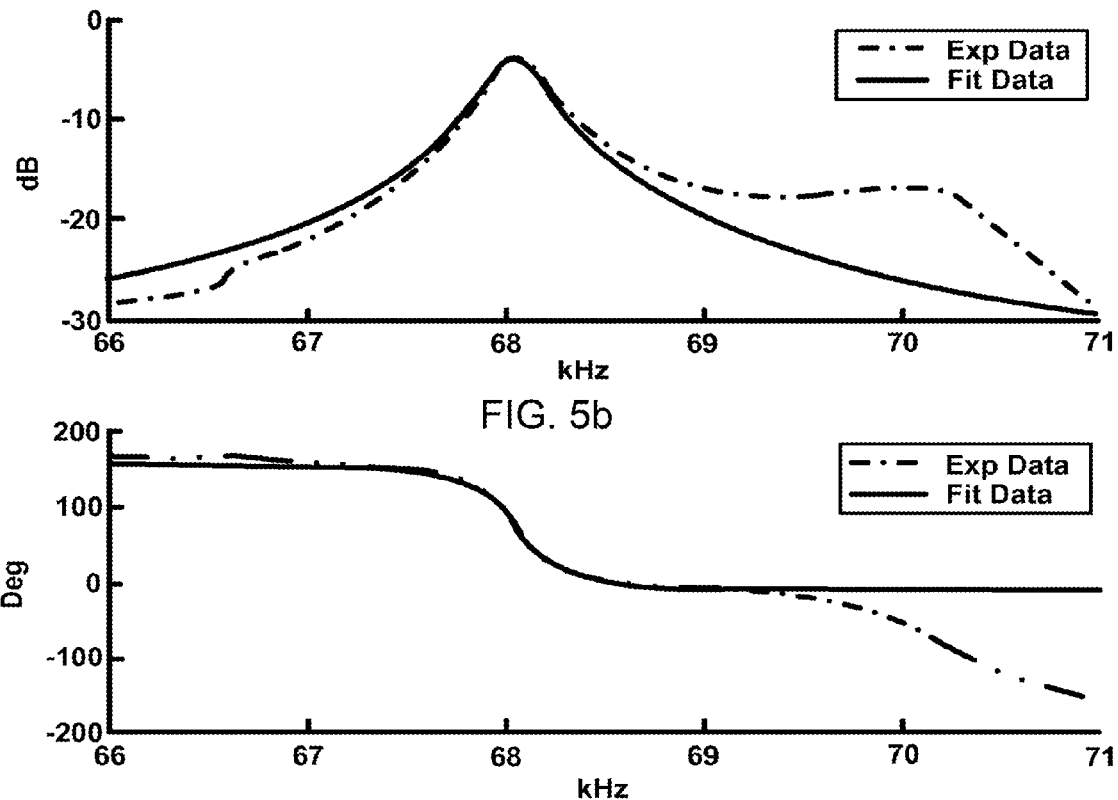
FIG. 5b
FIG. 5a
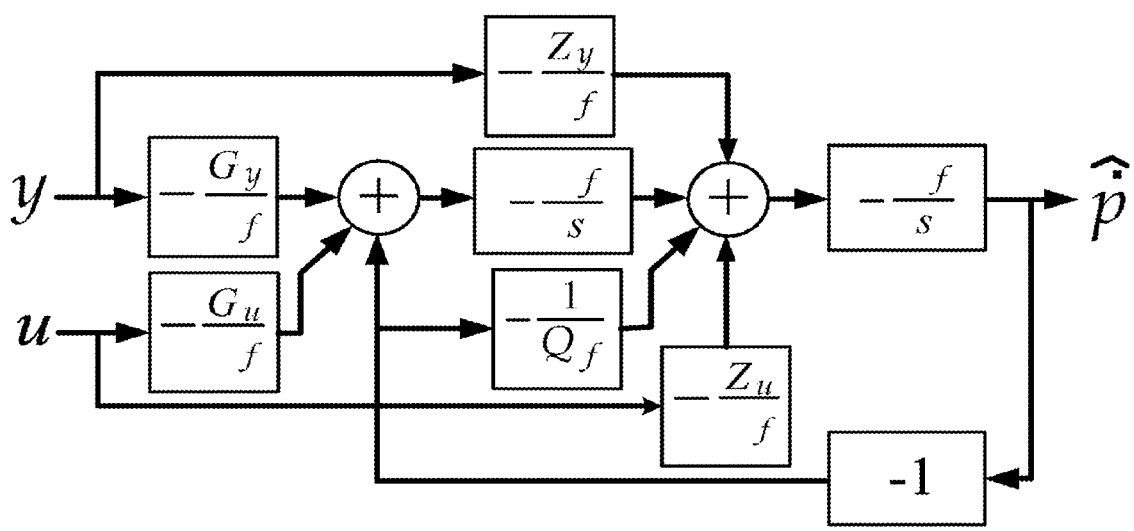
FIG. 6

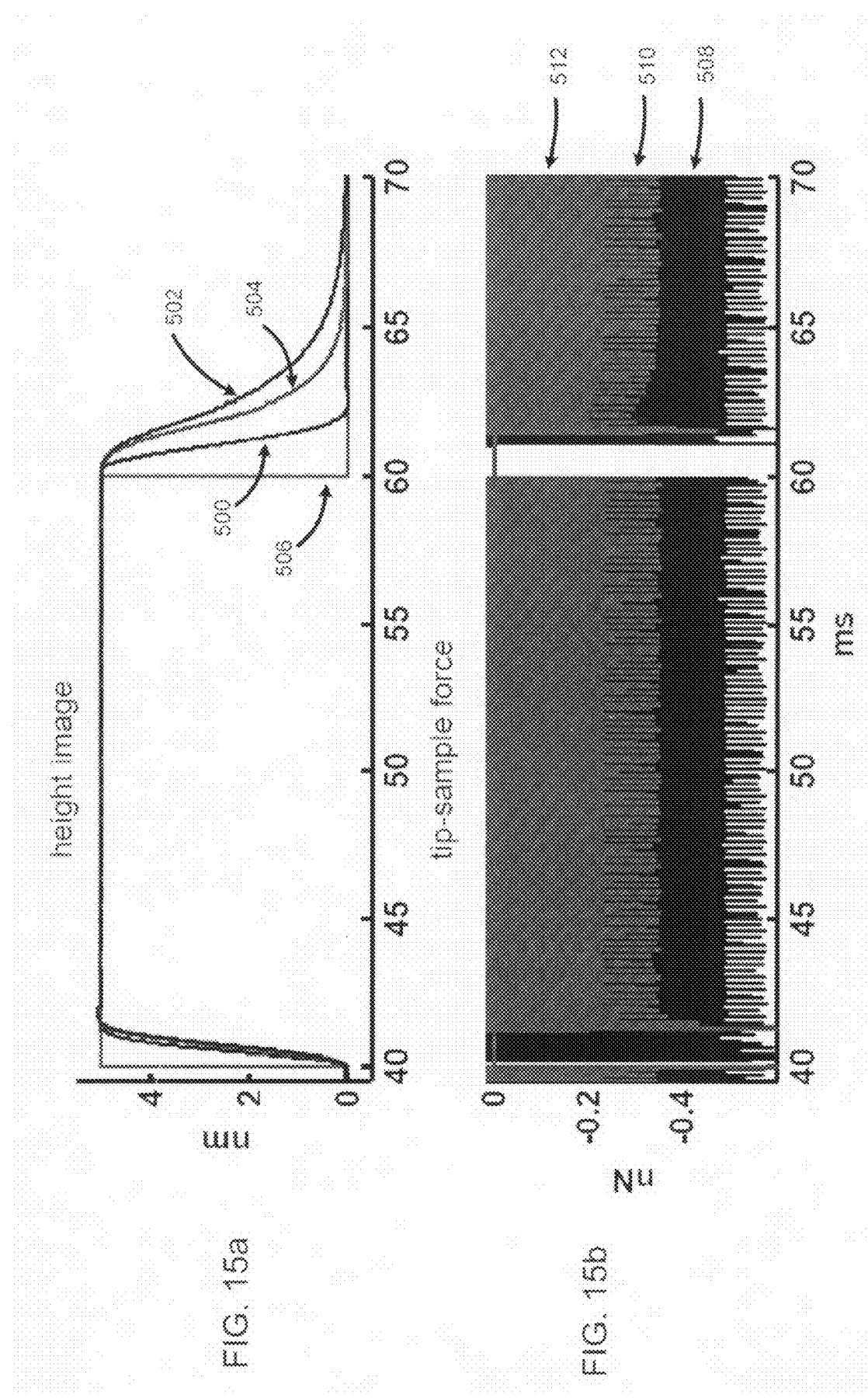

time (ms)

OBSERVER BASED Q-CONTROL IMAGING METHODS FOR ATOMIC FORCE MICROSCOPY

CROSS-REFERENCE TO RELATED PATENT APPLICATIONS

This patent application claims the benefit of U.S. Provisional Patent Application No. 60/745,968, filed Apr. 28, 2006, the entire disclosure of which is incorporated by reference in its entirety herein.

STATEMENT REGARDING FEDERALLY SPONSORED RESEARCH AND DEVELOPMENT

This invention was made in part with Government support under Grant Numbers ECS 0300463 and ECS 0330224 awarded by the National Science Foundation. The Government may have certain rights in this invention.

FIELD OF THE INVENTION

This invention generally relates to micro-cantilevers and more particularly relates to observer based transient imaging techniques.

BACKGROUND OF THE INVENTION

There is considerable interest in interrogation and manipulation of surface properties of inorganic and biological materials at molecular level using micro-cantilevers such as an atomic force microscope (AFM). The AFM is often operated in dynamic mode methods (i.e. amplitude modulation and frequency modulation) to image with low lateral force and high force sensitivity. A schematic of AFM operating in dynamic mode is shown in FIG. 1. In this mode of operation a sinusoidal excitation is applied at the base of the cantilever by a dither piezo. The tip of the oscillating cantilever interacts with the sample. The cantilever tip deflection is measured by a photo diode. A set point amplitude of the deflection signal is maintained by feeding back the amplitude signal to the sample positioning system (z-piezo). The sample is raster scanned by XY-scanner. In the amplitude modulation method, the corresponding control signal and the amplitude and phase of cantilever deflection signal during scanning is used to construct the image of the sample. During imaging the effective spring constant and damping coefficient of the cantilever changes due to interaction with the sample. In the frequency modulation method, the frequency of the excitation signal is regulated according to the shift in resonance frequency of the cantilever due to tip-sample interaction during scanning and the frequency shift is used to construct an image.

The scan speed is dictated by the mechanical bandwidth of the sample positioning system and the cantilever. The resolution is high if the quality factor (Q) of the cantilever is high. However due to high quality factor the settling time of the cantilever is high (since the bandwidth of the cantilever is low) and the imaging signals amplitude, phase and the frequency are slow. Therefore the bandwidth of imaging is low.

Recently several methods have been proposed to increase the bandwidth or the resolution of imaging in dynamic mode atomic force microscopy. For example, one method used is that while imaging in air, the scan speed is increased by using a z-piezo with high bandwidth and by active damping (Q-control) of the cantilever. In another method, the force sensitivity (resolution) is enhanced by 3 orders of magnitude by active Q-enhancement of the cantilever. Given a z-piezo with a high mechanical bandwidth the bandwidth and resolution of imaging is dictated by the Q of the cantilever.

There is considerable interest in imaging under fluids with Q-enhancement. Due to the presence of a moisture layer on the sample in air, molecular forces (in piconewton range) are not accessible due to capillary forces (in nanonewton range). However, atomic resolution images have been obtained in water. The samples, e.g., biological samples, are soft and they can be imaged in a buffer solution. The low lateral forces in fluids also favors imaging of biological sample as they are not displaced or destroyed. There are numerous advantages to image under fluids. However, under fluids the quality factor and the force sensitivity of the cantilever are reduced by approximately two orders of magnitude compared to their value in air. Therefore it is essential to actively enhance the Q of cantilever and consequently the force sensitivity in order to sense molecular lever forces and image the soft biological samples.

In the existing methods the deflection signal is phase shifted (or time delayed) and amplified before adding it to the standard excitation signal to control Q. This is based on the assumption that the output is purely sinusoidal and as a result, the phase shifted signal is assumed to provide a true estimate of velocity. However, in this approach, the trade off between bandwidth and resolution remains inherent. In spite of the specific needs, it is always desired to improve both bandwidth and resolution together.

BRIEF SUMMARY

The invention provides active quality factor (Q) control of a micro-cantilever using an observer based Q control method. The control method provides adjustable parameters that improve the resolution and bandwidth independently to an extent during imaging. These and other advantages of the invention, as well as additional inventive features, will be apparent from the description of the invention provided herein.

In one aspect, an observer based Q control method for a cantilever in an atomic force microscopy that provides the capability to have a "dual" Q behavior is provided such that a particular effective Q is achieved when the cantilever is on a sample and another effective Q when the cantilever is off the sample. In the control method, the transfer function from dither input to photo-diode output is independent of the observer so that the cantilever effectively behaves like a spring-mass-damper system. The effective quality factor and stiffness of the cantilever can be changed by appropriately choosing the state feedback gain.

In another aspect, the control method is used to provide imaging using the transient part of the cantilever response. The method can be used to image samples that have small features sizes such as, for example, DNA.

Other aspects, objectives and advantages of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings incorporated in and forming a part of the specification illustrate several aspects of the present invention and, together with the description, serve to explain the principles of the invention. In the drawings:

FIGS. 5a and 5b are graphs illustrating frequency response data of a model of an AFM in accordance with the teachings of the invention;

FIG. 6 is a block diagram of an observer designed and based upon the frequency response data of FIG. 5;

FIG. 13b shows the phase of the calibration sample, the conventional control method, and the dual Q control method of FIG. 13a;

FIG. 14a shows simulation results of the height image of a sample profile in a system having a cantilever quality factor of 200 that is reduced to 20 by the conventional control method of FIG. 13a and by the dual Q control method of FIG. 13a;

FIG. 14b shows the on sample tip-sample force of the sample profile of FIG. 14a using the conventional control method of FIG. 14a and the dual Q control method of FIG. 14a;

FIG. 15a shows simulation results of the height image of a sample profile when the quality factor of a cantilever having a quality factor of 10 is increased to a quality factor of 100 by the conventional control method of FIG. 13a and the dual Q control method of FIG. 13a;

FIG. 15b shows the on sample tip-sample force of the sample profile of FIG. 15a using the conventional control method of FIG. 15a and the dual Q control method of FIG. 15a;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

The observer based Q control methodology provides flexibility in the feedback loop to improve resolution in the case of active damping or improve bandwidth in the case of Q-enhancement during imaging. The feedback loop is fixed and the resolution and bandwidth are fixed according to the effective Q value. In the description that follows, the cantilever shall be in an AFM. Those skilled in the art will recognize that the methods described herein can be used in other cantilever applications.

The existing methods do not use a model of the AFM and they lack analysis (except numerical analysis) of the effect of feedback loop on bandwidth and resolution in the presence of sample. Observer based methods provides a detail analysis of the AFM with active Q-control in the presence of sample. Another advantage of observer based approach is the transient detection technique. Note that the imaging signals like the amplitude and phase of the cantilever deflection are slow varying, therefore they construct the low bandwidth (smooth) feature of sample surface in the image for a given scan rate and scan size. At a higher scan rate or scan size, the scan speed increases and the same sample features appear at a higher spatial frequency to the cantilever and the image becomes even smoother than the actual sample profile. Transient detection method incorporated to sample imaging with observer based Q control can detect high bandwidth content of the sample features at high scan rates which are indistinguishable in the amplitude and phase image. Observer based imaging with transient detection has the promise to improve the overall imaging rate by doing multiple scans at different scan speeds.

Figure 1:
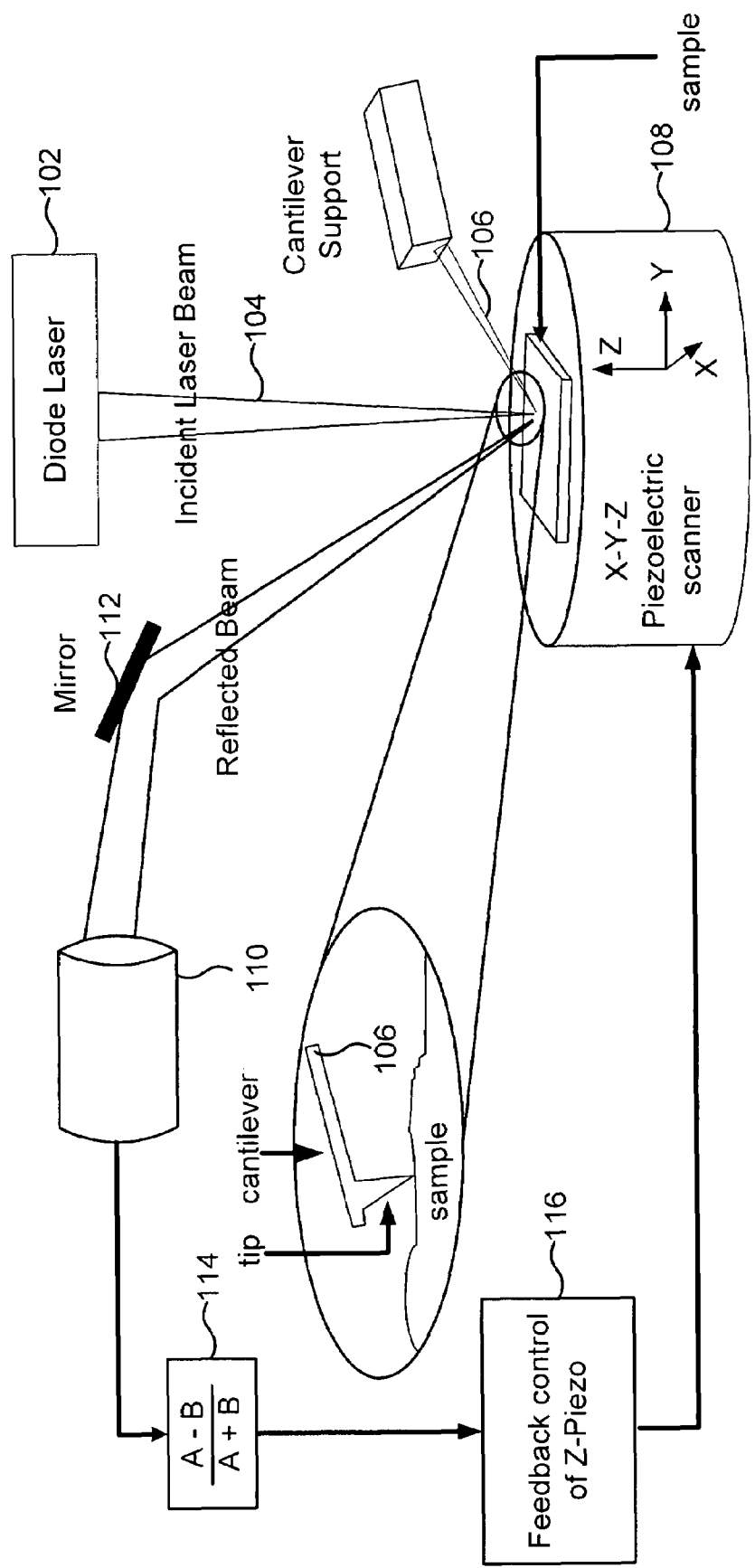
FIG. 1 is a schematic block diagram of an atomic force microscope (AFM) in which the invention may reside.

Turning to the drawings, wherein like reference numerals refer to like elements, the invention is illustrated as being implemented in a suitable environment. FIG. 1 illustrates an AFM 100. The laser 102 outputs a laser beam 104 that is pointed at the cantilever 106. A piezoelectric scanner 108 is used to position the sample in one embodiment. The laser beam 104 deflects off the cantilever 106 and is reflected into the split photo-diode 110 via mirror 112. The output of the split photo-diode is conditioned via module 114 and is input into control module 116 that is used to control the position of the sample by movement of piezoelectric scanner 108. The piezoelectric scanner 108 is rastered in the lateral directions and the deflection of the tip is used to interpret sample properties. In the dynamic mode, the dither piezo 118 is used to force the cantilever support 120 to move sinusoidally. The changes in the oscillations caused by the sample are interpreted to obtain its properties.

From a system perspective, the input signal to the atomic force microscope (AFM) is the excitation signal applied to the dither-piezo. The output signal is the deflection of the cantilever tip obtained from the photo-diode. The frequency of the excitation signal is close to the first resonance frequency of the cantilever. It is experimentally observed that near the first resonance frequency, the transfer function from the dither-piezo input to the photo-diode output is described by a second order model with a right half plane zero given by:

$$G(s) = \frac{k/m(c_1 + c_2 s)}{s^2 + \frac{\omega_0}{Q}s + \omega_0^2} \quad (1)$$

where k, m, $\omega_0$ and Q are the equivalent stiffness, equivalent mass, resonance frequency in rad/sec and quality factor of the cantilever with $k/m=\omega_0^2$. Note that by putting $c_1=1$ and $c_2=0$ in equation 1, the transfer function corresponding to the point mass description of the cantilever is obtained. A generalized AFM model derived from the input-output frequency response is considered to design an observer and to analyze the corresponding imaging method for atomic force microscopy.

Figure 2:
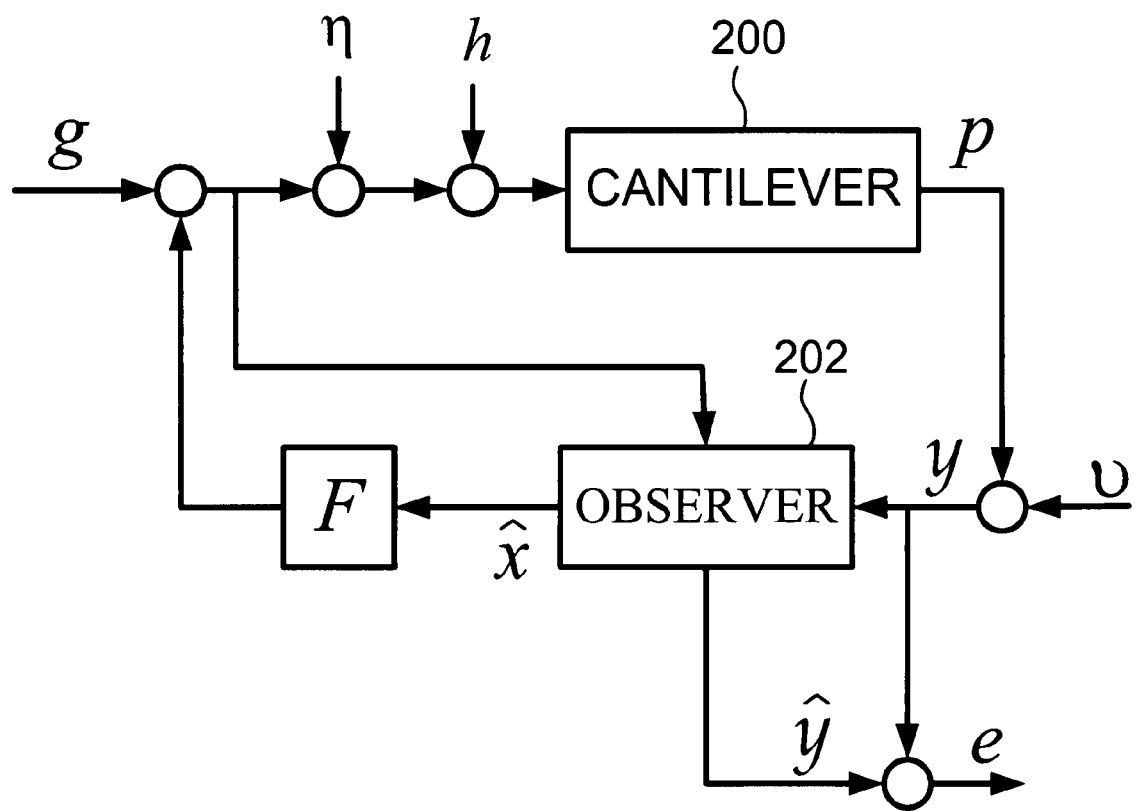
FIG. 2 is a block diagram model of an observer based Q control methodology in accordance with the teachings of the invention.

Turning now to FIG. 2, a comprehensive block diagram model of the AFM controller with an observer incorporates the effect of tip-surface force h, thermal noise η and photo-diode noise ν on cantilever dynamics. The controller is designed so that the effect of g on the deflection p (when h=0; sample is absent) can be modeled exactly as a spring mass damper system with effective spring constant and the effective quality factor that can be chosen by choosing the feedback gain F to equal $[F_1\ F_2]$ respectively. The cantilever module 200 is the model of the cantilever. The cantilever module 200 has inputs g(t) and η(t) where g(t) is the external forcing on the cantilever and η(t) is the thermal noise. The comprehensive model is given in state-space form by:

$$\dot{x}=Ax+Bu+B_1h+B_1\eta;\ x(0)=x_0$$

$$y=Cx+\nu \quad (2)$$

where state matrices A, B, $B_1$ and C are realized from the frequency response from dither-piezo input to photodiode output, x is the dynamic state of the cantilever, u is the dither-piezo input and y is the photo-diode output. The canonical realization of the transfer function (fitted to the frequency response of AFM) in equation 1 gives cantilever-tip position $$A = [0, 1; -\omega_0^2, \omega_0/Q], B = [0; k/m], B_1 = [0; 1/m] \text{ and } C = [c_1, c_2],$$

$$p = Cx \text{ and velocity } v = [0, 1]x.$$

Note that for a fixed separation between the mean position of the cantilever and the sample, the tip-interaction force h is a function of tip position p, i.e. $h=\Phi(p)$. The function $\Phi$ is a nonlinear function of p and depends on the sample. In presence of a sample, p can be described by:

$$p = \Phi_{hp} h + \Phi_{gp} g,$$

$$h = \Phi(p),$$

where $\Phi_{hp}$ and $\Phi_{gp}$ are the maps from h→p and g→p respectively. The cantilever dynamics is complex in the presence of sample. However by treating h as an independent input to the cantilever in presence of sample, qualitative arguments about bandwidth and resolution during imaging are obtained and verified through simulation.

An observer 202 is designed based on the AFM model given by equation 2 that provides the estimated position $\hat{p}$ and velocity $\hat{v}$ signal of the tip of the cantilever. In observer based Q control paradigm $\hat{p}$ and $\hat{v}$ are added in feedback to the standard excitation signal g to actively damp or enhance the Q of the cantilever. The observer dynamics is given by:

$$\dot{\hat{x}} = A\hat{x} + Bu + L(y - C\hat{x}); \hat{x}(0) = \hat{x}_0,$$

$$u = (g + F\hat{x}),$$

$$\hat{p} = C\hat{x},$$

$$\hat{v} = D\hat{x}, \quad (3)$$

where L is the observer gain and F is the state feedback gain.

Letting $\tilde{x} = x - \hat{x}$ denote the state estimation error, the combined cantilever-observer dynamics is given by, $$\begin{bmatrix} \dot{x} \\ \dot{\tilde{x}} \end{bmatrix} = \begin{bmatrix} A+BF & -BF \\ 0 & A-LC \end{bmatrix} \begin{bmatrix} x \\ \tilde{x} \end{bmatrix} + \quad (4)$$

$$\begin{bmatrix} B \\ 0 \end{bmatrix} g + \begin{bmatrix} B_1 \\ B_1 \end{bmatrix}(h+\eta) - \begin{bmatrix} 0 \\ L \end{bmatrix} v, \begin{bmatrix} y \\ \hat{p} \\ \hat{v} \end{bmatrix} = \begin{bmatrix} C & 0 \\ C & -C \\ D & -D \end{bmatrix} \begin{bmatrix} x \\ \tilde{x} \end{bmatrix} + \begin{bmatrix} 1 \\ 0 \\ 0 \end{bmatrix} v.$$

Active Q control of the cantilever by feeding back the estimated tip velocity (i.e. $F_1 = 0$) is considered.

It can be shown from equation 4 that the transfer function from the excitation signal g to the cantilever-tip deflection signal y is given by:

$$(g \rightarrow y)(s) \quad (5)$$

$$= C[sI - (A+BF)]^{-1}B,$$

-continued $$= \frac{k/m(c_1 + c_2 s)}{s^2 + s\frac{\omega_{qc}}{Q_{qc}} + \omega_{qc}^2}$$

where $(k/m)F = [F_1, F_2], \frac{\omega_{qc}}{Q_{qc}} = \frac{\omega_0}{Q} - F_2,$ and $$\omega_{qc}^2 = \omega_0^2 - F_1,$$

where $\omega_{qc}$ and $Q_{qc}$ are the modified resonant frequency and quality factor of the cantilever.

Note that (g→y)(s) is an exact second order transfer function. It is independent of observer gain L. Note that in this paradigm the modified cantilever dynamics behaves like a spring-mass-damper system with Q control. Note that (g→y)(s) in prior methods (with a phase shifter or time delay implemented into the feedback architecture) is a high order or infinite dimensional system and the existing architecture is therefore difficult to analyze.

In existing methods the feedback signal is considered as the tip-velocity which is not true and the change in Q is poorly quantified. From equation 5 it can be seen that by appropriately choosing F, a desired quality factor and resonance frequency of the cantilever can be obtained. Note that $\omega_{qc}^2 = \sqrt{k_{qc}/m}$, $k_{qc}$ being the modified stiffness of the cantilever. Therefore a desired stiffness of the cantilever can be obtained by feeding back the estimated tip position signal. By varying $F_2$ only the desired quality factor can be achieved independently. However when it is desired to increase or decrease the stiffness of the cantilever, the quality factor changes proportionally.

Note that the cantilever stiffness and quality factor are the parameters describing various imaging performance measures like force sensitivity, resolution and bandwidth. The force sensitivity can be enhanced by increasing Q or by decreasing k. The spatial resolution and phase contrast can be improved by enhancing the Q of the cantilever. Bandwidth can be enhanced by damping the cantilever. Hence there is a tradeoff between resolution and bandwidth.

The feedback effect of tip-sample interaction force h, thermal noise $\eta$ and photo-diode noise v during imaging on active Q-control is not analyzed in existing methods. The observer based method also provides flexibility in terms of state estimate gain L. It is shown below that by tweaking L, remarkable advantages with respect to resolution and bandwidth and noise reduction is obtained during imaging.

The effect of tip-sample force h on tip deflection y during imaging is given by the transfer function:

$$(h \rightarrow y)(s) = C[sI - A_{BF}]^{-1}B_1 - \quad (6)$$

$$C[sI - A_{BF}]^{-1}BF[sI - A_{LC}]^{-1}B_1, = \frac{1/m(c_1 + c_2 s)}{s^2 + s\frac{\omega_{qc}}{Q_{qc}} + \omega_{qc}^2} -$$

$$\frac{1/m(c_1 + c_2 s)[F_1(1 - l_1 c_2) + F_2(s + l_1 c_1)]}{\left[s^2 + s\frac{\omega_{qc}}{Q_{qc}} + \omega_{qc}^2\right]\left[s^2 + s\frac{\omega_{kf}}{Q_{kf}} + \omega_{kf}^2\right]}.$$

where $A_{BF}=A+BF, A_{LC}=A-LC$, $$\frac{\omega_{kf}}{Q_{kf}} = \frac{\omega_0}{Q} + l_1 c_1 + l_2 c_2,$$

and $$\omega_{kf}^2 = \omega_0^2 (1 - l_1 c_2) + l_1 c_1 \frac{\omega_0}{Q} + l_2 c_1.$$

The bandwidth and resolution during imaging depends on $(h \to y)(s)$ and $(g \to y)(s)$. If the gain of $(h \to y)(s)$ is high, the effect of h on y is high and consequently the resolution is high. If the bandwidth of $(h \to y)(s)$ is high, the tip deflection due to h settle down fast and consequently the bandwidth is high. When there is no Q-control (i.e. F=0), $(h \to y)(s) = (g \to y)(s)/k$. Therefore the bandwidth and resolution during imaging is dictated by the Q of the cantilever. However with Q control i.e. with $F \ne 0$, $(h \to y)(s)$ is different from the transfer function $(g \to y)(s)/k$ and depends on L. Therefore with Q-control, the bandwidth and resolution of imaging in presence of sample depends on $Q_{qc}$ of the cantilever and the value of state estimation gain L. The value of estimated-state feedback gain F to achieve a desired damping or Q enhancement of the cantilever can be calculated from equation 5. However the actual bandwidth and resolution during imaging is different from the desired as dictated by $(h \to y)(s)$. It can be shown that in existing Q-control methods $(h \to y)(s) \approx (g \to y)(s)$. Therefore the bandwidth and resolution is approximately given by $Q_{qc}$ of the cantilever and there is no leverage for improvement as provided by the observer based method.

The simulation results using the transfer functions obtained from experimental frequency response shall now be presented. The qualitative arguments given above are verified from the simulation results. Observer based Q control for active damping in air and Q enhancement in water is considered. The benefits of observer based Q control in atomic force microscopy by using smaller observer gain L are presented. Note that here small value of L means slow tracking.

Figure 3E:
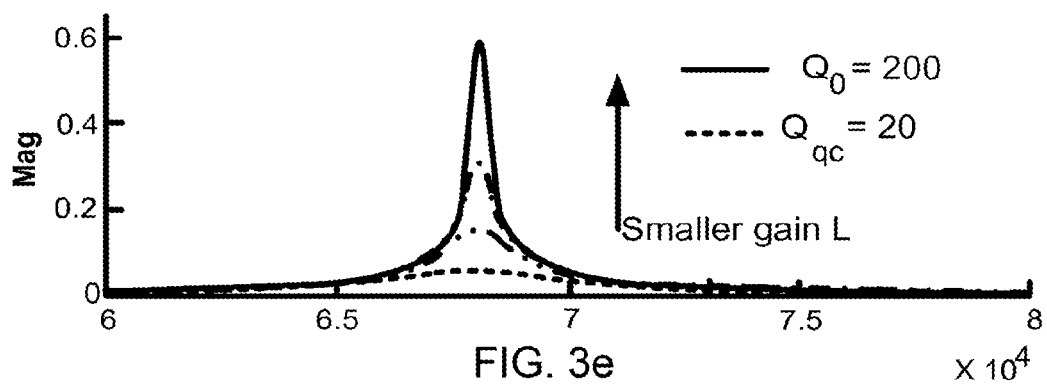
FIGS. 3a and 3e are graphs illustrating a transfer function from a tip-sample interaction to deflection signal plotted for different values of observer gain L when the cantilever is oscillating in air.
Figure 3A:
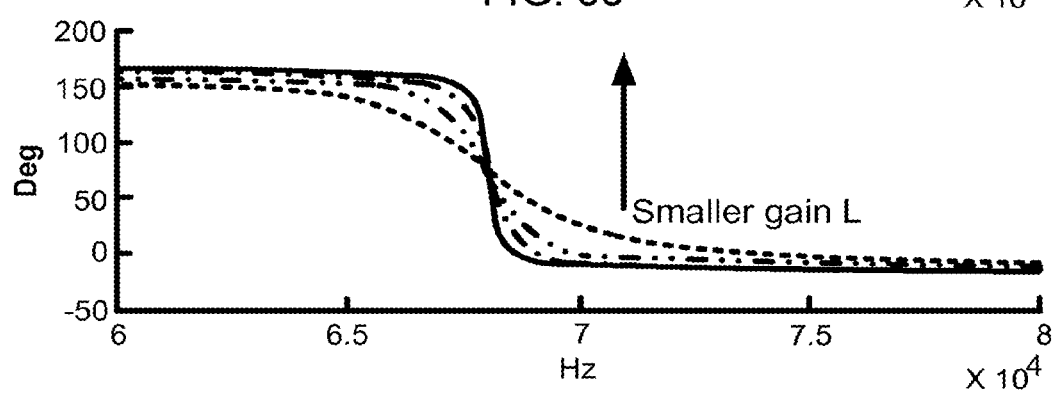
Figure 3B:
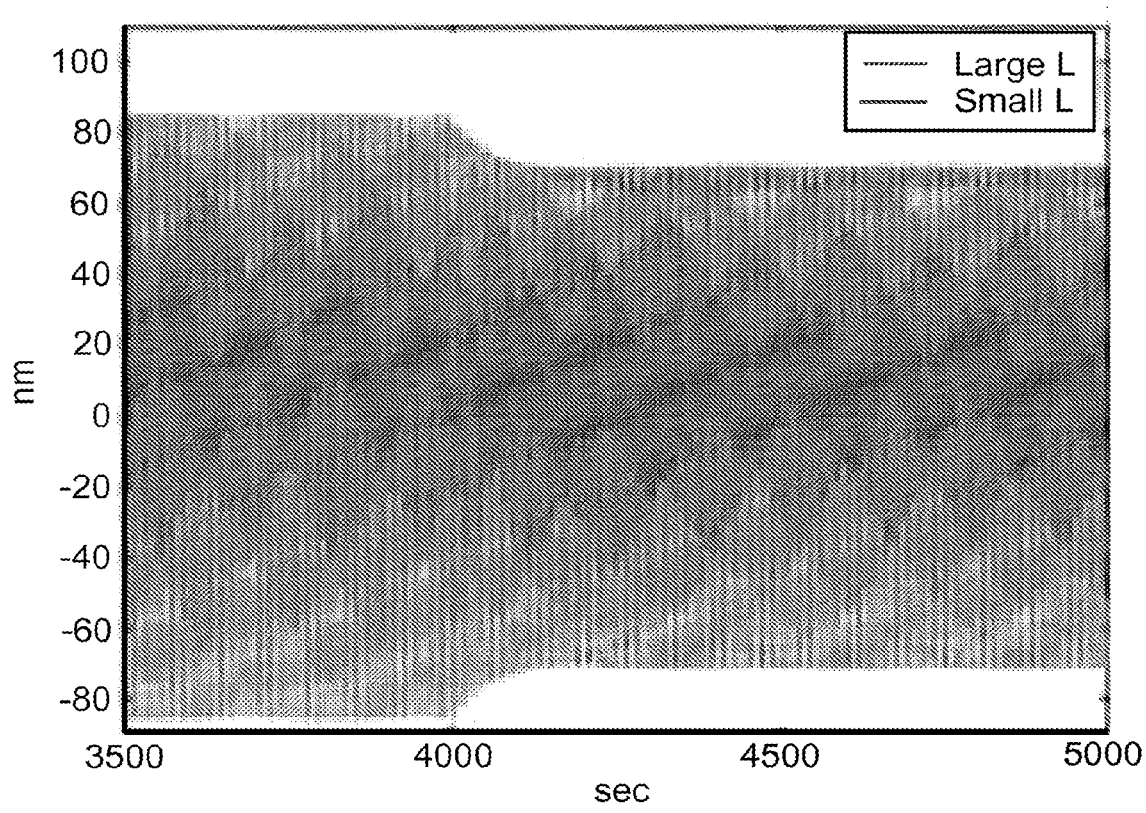
FIG. 3b is graph illustrating a deflection signal for small and large values of observer gain L when the cantilever encounters a step sample profile while freely oscillating in air.
Figure 3F:
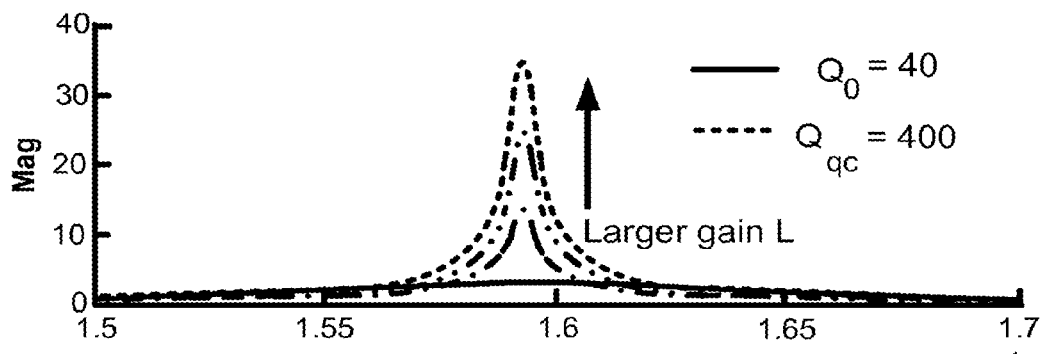
FIGS. 3c and 3f are graphs illustrating a transfer function from a tip-sample interaction to deflection signal plotted for different values of observer gain L when the cantilever is oscillating under water.
Figure 3C:
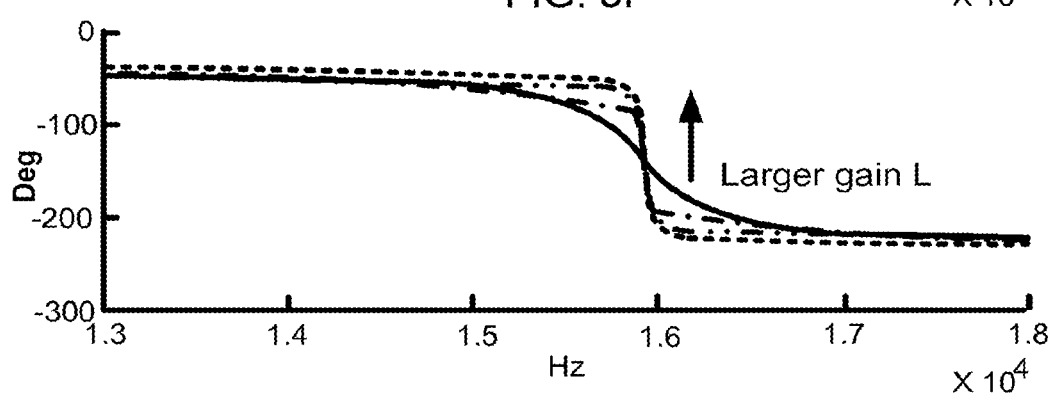

Turning now to FIGS. 3a-3f, the transfer function from tip-sample interaction h to deflection signal y is plotted for different values of observer gain L when the cantilever is oscillating in air (FIGS. 3a and 3e) and actively damped and underwater (FIGS. 3c and 3f). The deflection signal for small and large values of L is plotted in FIGS. 3b and 3d. In FIGS. 3a and 3e, the "outer envelope" of the smaller value of observer gain is shown as a line and the "outer envelope" of a larger value of observer gain that can be seen in shown as a dashed line. Similarly, in FIG. 3d, the "outer envelope" of the smaller value of observer gain is shown as a line and the "outer envelope" of a larger value of observer gain that can be seen in shown as a dashed line. For small L, the gain from $h \to y$ is high in FIGS. 3a and 3e which agrees with small steady state amplitude in FIG. 3b when the sample is present indicating an improvement in resolution. For small L, the bandwidth of $(h \to y)(s)$ is high in FIGS. 3c and 3f which agrees with small settling time in FIG. 3d indicating an improvement in bandwidth.

A cantilever oscillating in air with Q=200 is damped by 10 times to $Q_{qc}=20$ by choosing $F=k/m[0,9\omega_0/Q]$. $(h \to y)(s)$ for different values of observer gain L is plotted in FIGS. 3a and 3e. As the values of L increases, $(h \to y)(s)$ approaches $(g \to y)(s)/k$. Therefore given L the actual gain in bandwidth of imaging is less than the desired value 10 in presence of the sample. However by choosing smaller values of L, the effect of tip-sample forces on tip deflection y can be enhanced. In FIG. 3b the deflection signal y is plotted when the cantilever encounters a step sample profile of 8 nm height at time instant 4000 µsec while freely oscillating at 85 nm. For smaller value of L the cantilever settles down to a lower amplitude. Thus a higher force sensitivity and resolution is achieved by using a smaller value for L. When the step sample profile goes away, i.e. h=0, the deflection signal builds up to the free oscillation amplitude at desired bandwidth. The simulation shows that at a given scan speed and increase in bandwidth by active damping, the resolution can be improved by choosing smaller value for L.

Figure 3D:
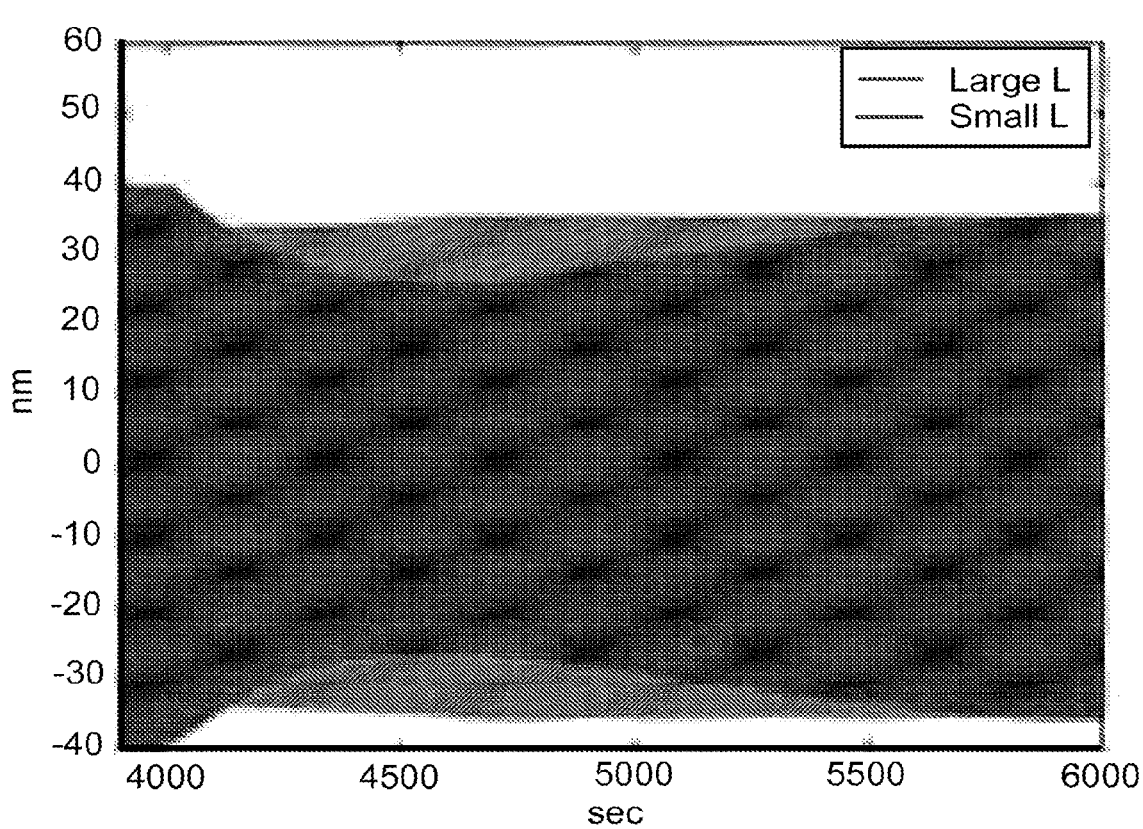
FIG. 3d is graph illustrating a deflection signal for small and large values of observer gain L when the cantilever encounters a step sample profile while freely oscillating under water.

A Q of a cantilever oscillating in water with Q=40 is enhanced by 10 times to $Q_{qc}=400$ by choosing $F=k/m[0,-0.9\omega_0/Q]$. $(h \to y)(s)$ for different values of observer gain L is plotted in FIGS. 3c and 3f. For larger values of L, $(h \to y)(s)$ approaches $(g \to y)(s)/k$ from below. Therefore for given L the actual improvement in resolution obtained during imaging is less than the desired value 10. However by choosing smaller values of L a better bandwidth can be obtained in presence of tip-sample force h. In FIG. 3d the deflection signal y is plotted when the cantilever encounters a step sample profile of 2 nm height at time instant 4000 µsec while freely oscillating at 39 nm. For smaller value of L the cantilever takes shorter time to settle down. Due to high Q the cantilever settles down to the attractive regime of the sample where h is small. Therefore the difference in amplitudes is small for different L. By choosing small L the force sensitivity or resolution is not compromised; however the bandwidth is enhanced in presence of sample. When h=0, i.e. the step sample profile goes away the deflection signal builds up to the free oscillation amplitude at the bandwidth corresponding to the Q enhancement. The simulation shows that at a given scan speed and Q enhancement, the bandwidth can be improved by choosing smaller value for L.

The effect of thermal noise $\eta$ and photo-diode noise $\nu$ on the deflection signal y is given by the transfer functions:

$$(\eta \to y)(s) = (h \to y)(s) \qquad (7)$$

and $$(\nu \to y)(s) = 1 + C[sI - A_{BF}]^{-1} BF[sI - A_{LC}]^{-1} L = \qquad (8)$$

$$1 + \frac{(c_1 + c_2 s)}{s^2 + s \frac{\omega_{qc}}{Q_{qc}} + \omega_{qc}^2} \times \frac{F_1 \left( l_1 \frac{\omega_0}{Q} + l_2 \right) - F_2 l_1 \omega_0^2 + s(F_1 l_1 + F_2 l_2)}{s^2 + s \frac{\omega_{kf}}{Q_{kf}} + \omega_{kf}^2}$$

respectively.

The effect of thermal noise $\eta$ and photo-diode noise $\nu$ on estimated cantilever-tip position $\hat{p}$ is given by the transfer functions:

$$(\eta \to \hat{p})(s) = C[sI - A_{BF}]^{-1} L - C[sI - A_{LC}]^{-1} B_1 - \qquad (9)$$

$$C[sI - A_{BF}]^{-1} BF[sI - A_{LC}]^{-1} B_1 = \frac{1/m(c_1 + c_2 s)}{s^2 + s \frac{\omega_{qc}}{Q_{qc}} + \omega_2^2} -$$

-continued $$\frac{1/m(c_1+c_2s)}{s^2+s\frac{\omega_{kf}}{Q_{kf}}+\omega_{kf}^2}-\frac{1/m(c_1+c_2s)[F_1(1-l_1c_2)+F_2(s+l_1c_1)]}{\left[s^2+s\frac{\omega_{qc}}{Q_{qc}}+\omega_{qc}^2\right]\left[s^2+s\frac{\omega_{kf}}{Q_{kf}}+\omega_{kf}^2\right]}$$

and $$(v\to\hat{p})(s)=C[sI-A_{LC}]^{-1}L+C[sI-A_{BF}]^{-1}BF[sI-A_{LC}]^{-1}L= \qquad (10)$$

$$\frac{c_1\left(l_1\frac{\omega_0}{Q}+l_2\right)-c_2l_1\omega_0^2+s(c_1l_1+c_2l_2)}{s^2+s\frac{\omega_{kf}}{Q_{kf}}+\omega_{kf}^2}+$$

$$\frac{(c_1+c_2s)}{s^2+s\frac{\omega_{qc}}{Q_{qc}}+\omega_{qc}^2}\times\frac{F_1\left(l_1\frac{\omega_0}{Q}+l_2\right)-F_2l_1\omega_0^2+s(F_1l_1+F_2l_2)}{s^2+s\frac{\omega_{kf}}{Q_{kf}}+\omega_{kf}^2}$$

respectively.

The severity of the effect of thermal noise η and photodiode noise ν on deflection signal y and tip-position estimate $\hat{p}$ is obtained by analyzing equations 7, 9, 8 and 10 for different values of gain F and L. It can be shown that if the cantilever is actively damped (i.e.

$$\frac{\omega_{qc}}{Q_{qc}}$$

is increased) the effects of thermal noise and photo-diode noise in deflection signal and tip position estimate are reduced. In the case of Q-enhancement of the cantilever the effect of thermal noise and photo-diode noise is also enhanced in deflection signal and tip position estimate. From equations 9 and 10, it can be shown that the noise effect further reduces in $\hat{p}$ by choosing smaller values of L for both damping and Q enhancement scenario.

Figure 4A:
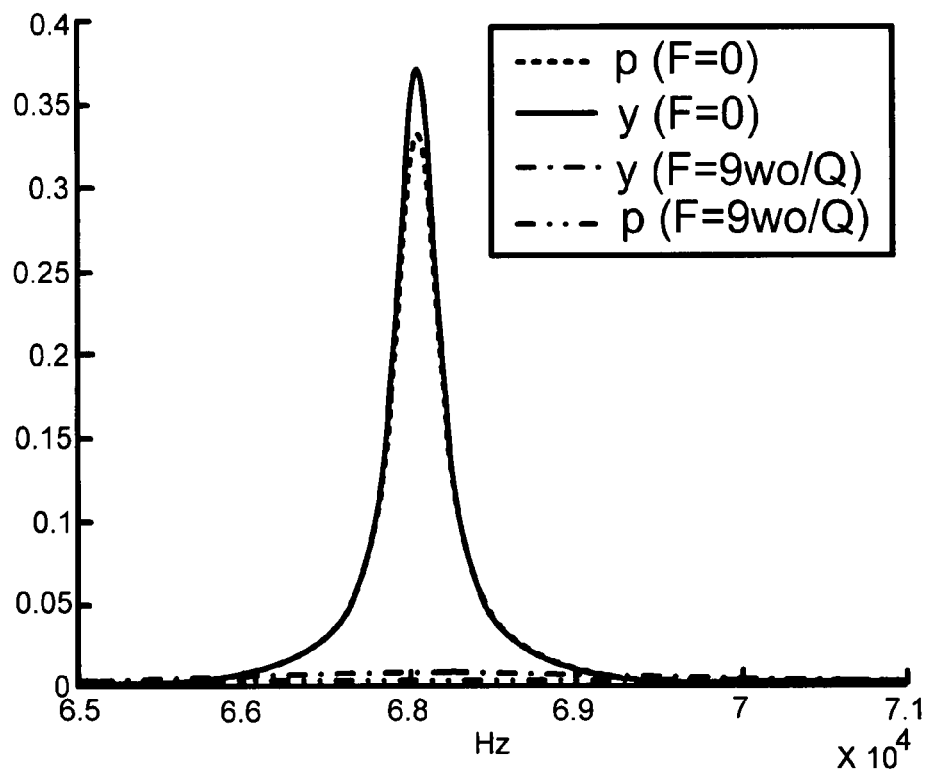
FIG. 4a is graph illustrating a transfer function from thermal noise to deflection signal and tip position estimate plotted when the cantilever is oscillating in air and damped.
Figure 4B:
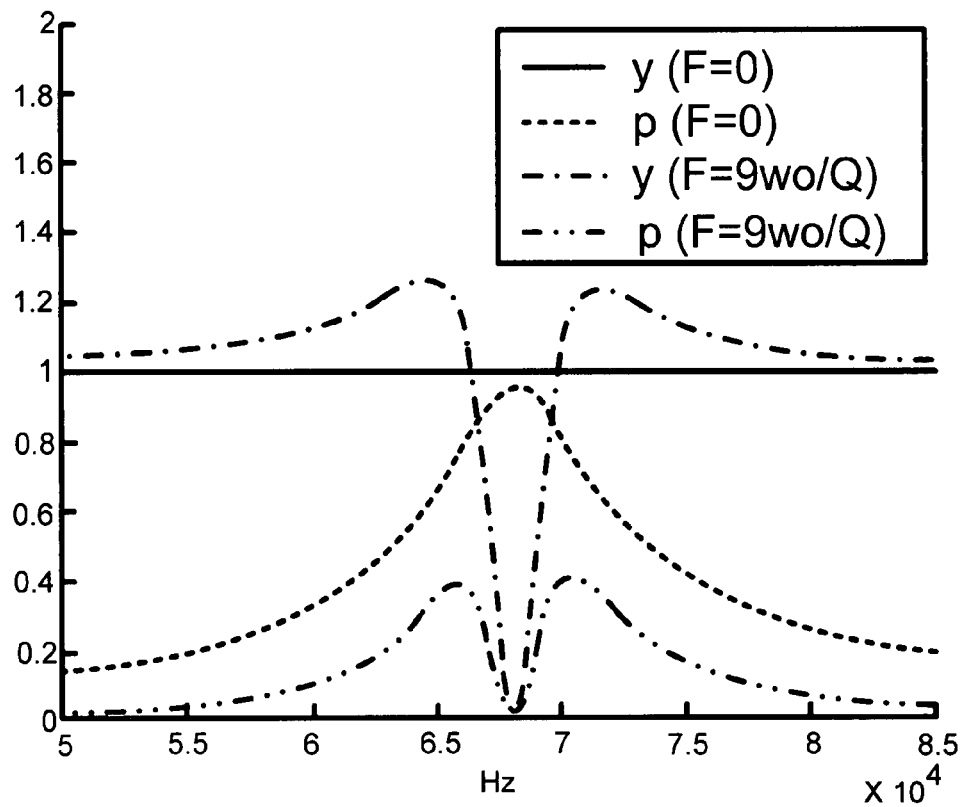
FIG. 4b is graph illustrating a transfer function from photodiode noise to deflection signal and tip position estimate plotted when the cantilever is oscillating in air and damped.
Figure 4C:
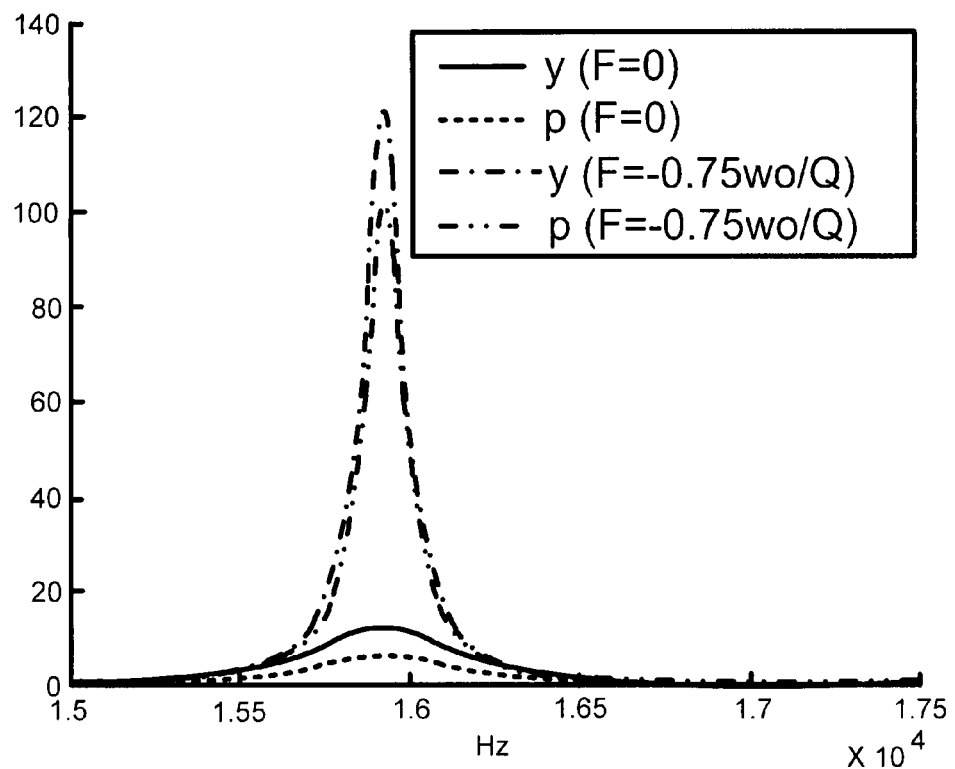
FIG. 4c is graph illustrating a transfer function from thermal noise interaction to deflection signal and tip position estimate plotted when the cantilever is oscillating in water and Q enhanced.
Figure 4D:
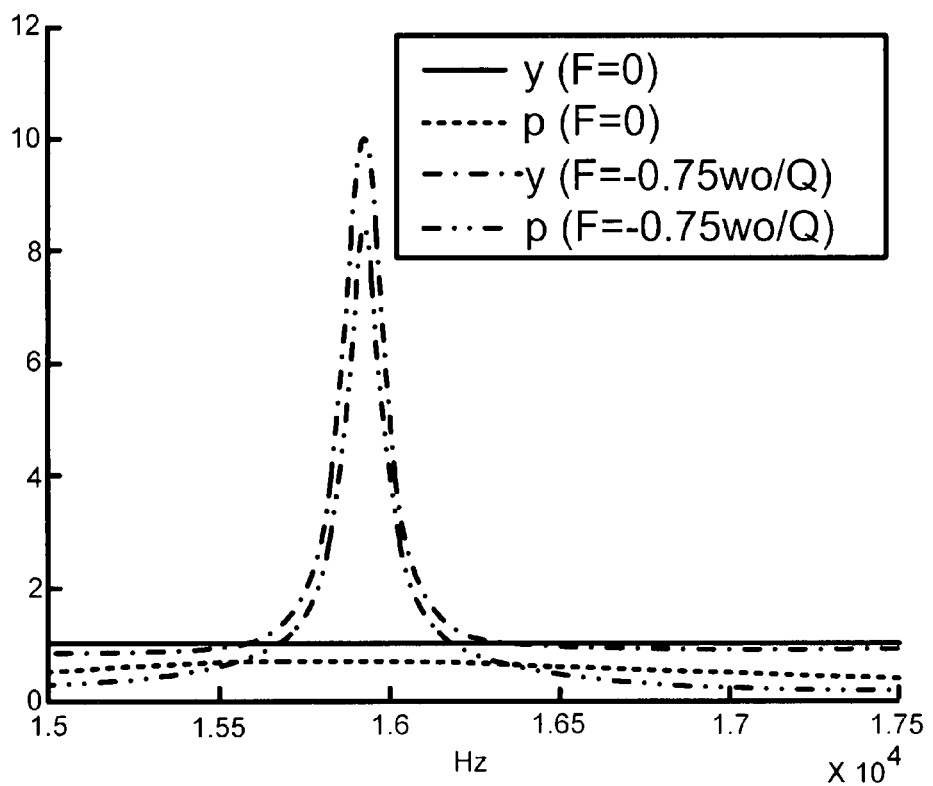
FIG. 4d is graph illustrating a transfer function from photodiode noise to deflection signal and tip position estimate plotted when the cantilever is oscillating in water and Q enhanced.

In FIGS. 4a and 4b, the thermal noise power and photodiode noise power in y and $\hat{p}$ respectively are shown when the cantilever is oscillating in air. It is observed that when the cantilever is damped by an order of magnitude the noise contribution is also reduced by an order of magnitude. In FIGS. 4c and 4d, the thermal noise power and photo-diode noise power in y and $\hat{p}$ respectively are shown when the cantilever is oscillating in water. It is observed that when quality factor of the cantilever is enhanced by four times in its magnitude the noise contribution increases by over an order of magnitude. Therefore the thermal noise and more prominently the photodiode noise may have drastic effects while imaging under fluid with large Q enhancement.

The transfer function from tip-sample interaction force h to estimated cantilever-tip position $\hat{p}$ is given by:

$$(h\to\hat{p})(s)=C[sI-A_{BF}]^{-1}B_1-C[sI-A_{LC}]^{-1}B_1-$$

$$C[sI-A_{BF}]^{-1}BF[sI-A_{LC}]^{-1}B_1,=\frac{1/m(c_1+c_2s)}{s^2+s\frac{\omega_{qc}}{Q_{qc}}+\omega_{qc}^2}-$$

-continued $$\frac{1/m(c_1+c_2s)}{s^2+s\frac{\omega_{kf}}{Q_{kf}}+\omega_{kf}^2}-\frac{1/m(c_1+c_2s)[F_1(1-l_1c_2)+F_2(s+l_1c_1)]}{\left[s^2+s\frac{\omega_{qc}}{Q_{qc}}+\omega_{qc}^2\right]\left[s^2+s\frac{\omega_{kf}}{Q_{kf}}+\omega_{kf}^2\right]}$$

Fixed F the gain from h→$\hat{p}$ is less than gain from h→$\hat{p}$ for different values of L. However $\hat{p}$ has additional benefits due to low noise from filtering.

The observer based imaging methodology has numerous benefits with respect to resolution, bandwidth and noise reduction. However the imaging signals—i.e. the amplitude and phase of deflection signal y and estimated tip position $\hat{p}$—remain slow. Therefore at a given scan speed, these signals represent a low bandwidth content (slow varying features) of the actual sample profile. As the scan speed is increased the image looks smoother and the fine details of the sample are lost. The transient detection scheme can be readily used with the observer. The transient detection technique has promise of detecting high bandwidth content of sample profile. Even small tip-sample interactions corresponding to subnanometer level sample features can also be detected with a high probability. We consider the transient detection scheme with Q-control in true imaging scenario.

The effect of excitation signal g on innovation signal e=y−C$\hat{x}$ is given by the transfer function: (g→e)(s)=0. The effect of tip-sample interaction force h on innovation signal e is given by the transfer function:

$$(h\to e)(s)=C[sI-A-LC]^{-1}B_1, \qquad (11)$$

$$=\frac{1/m(c_1+c_2s)}{s^2+s\frac{\omega_{kf}}{Q_{kf}}+\omega_{kf}^2}.$$

The transient signal is not affected by the choice of F. The transient detection scheme can be implemented independent of the Q-control scheme. It can be shown from equation 11 that the bandwidth of detecting tip-sample interaction $$\left(BW_{kf}\propto\frac{\omega_{kf}}{Q_{kf}}\right)$$

can be enhanced which is independent of Q.

Experimental results shall now be described. In the experiments a DI multi-mode AFM with an extender and signal access module was used. The frequency response of the AFM setup is obtained via a HP 3563A control system analyzer. A model of the AFM is obtained from the frequency response data as shown in FIGS. 5a and 5b.

The noise in the measurement and the thermal noise are experimentally determined. The measurement noise (mainly photo-diode noise) is quantified from the deflection signal when the cantilever is forced to remain in contact with a hard sample surface. The thermal noise is measured from the deflection signal of freely oscillating cantilever with no excitation signal (g=0).

Figure 7E:
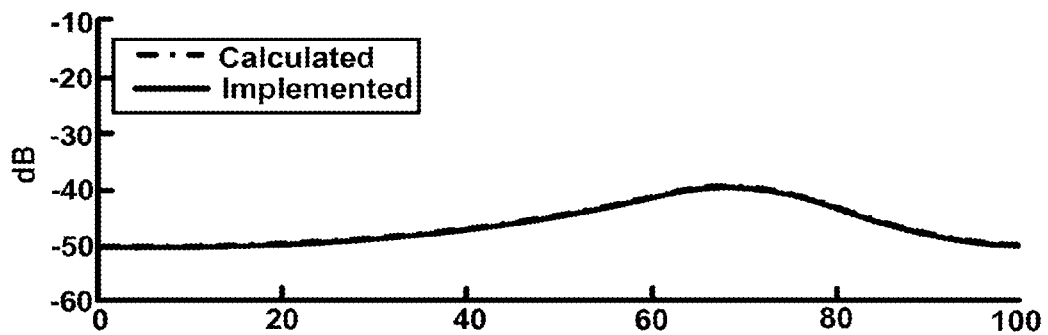
FIGS. 7a and 7e are graphs illustrating a calculated and implemented observer transfer function from dither excitation to tip position estimate of the observer of FIG. 6.
Figure 7A:
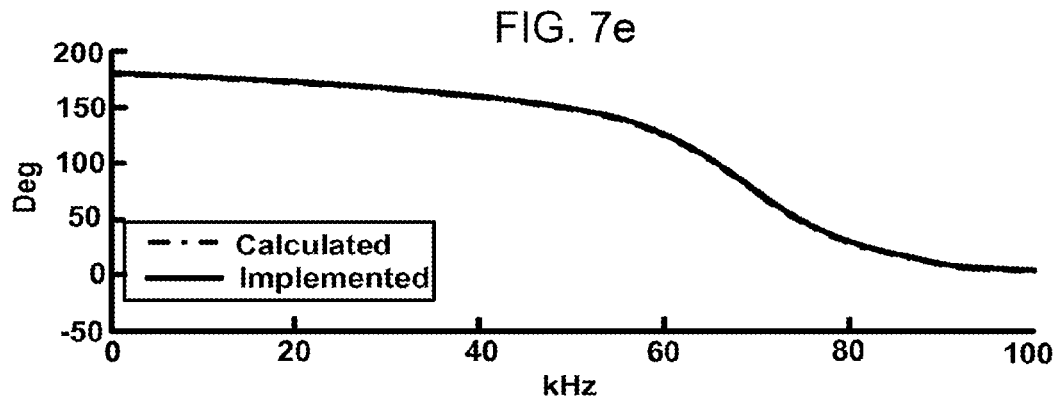
Figure 7F:
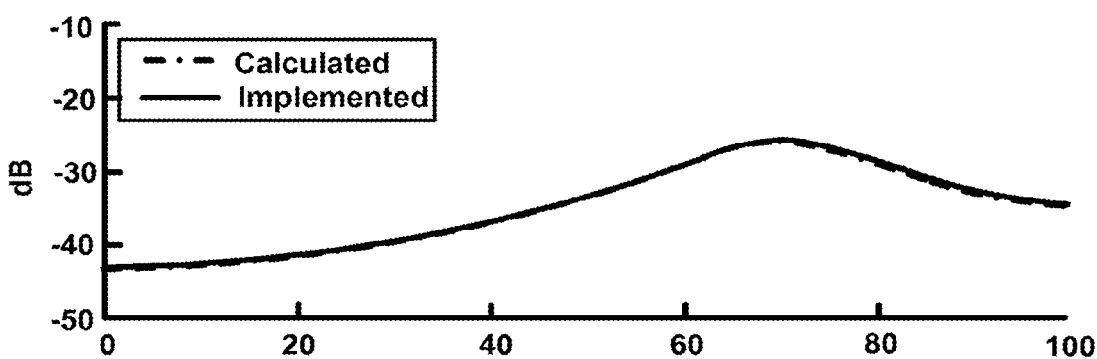
FIGS. 7b and 7f are graphs illustrating a calculated and implemented observer transfer function from tip deflection to tip position estimate of the observer of FIG. 6.
Figure 7B:
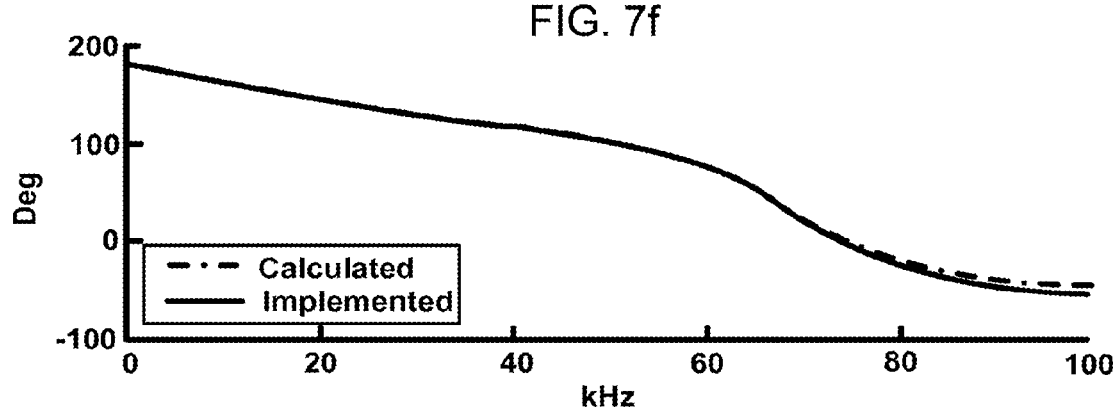
Figure 7G:
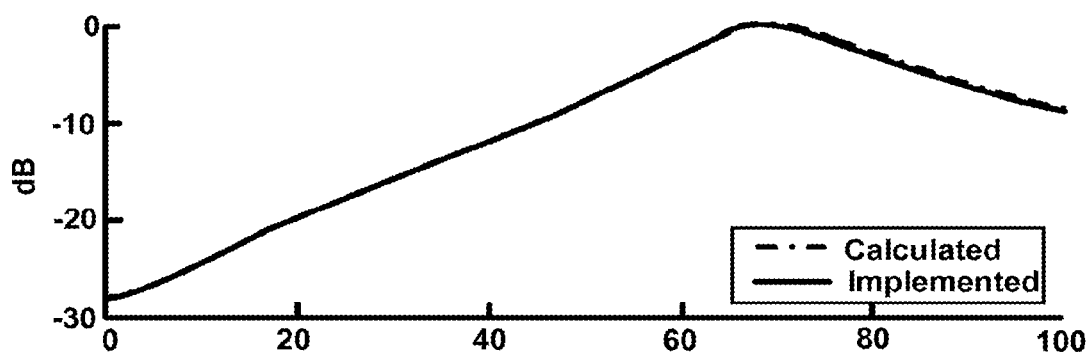
FIGS. 7c and 7g are graphs illustrating a calculated and implemented observer transfer function from dither excitation to tip velocity estimate of the observer of FIG. 6.
Figure 7C:
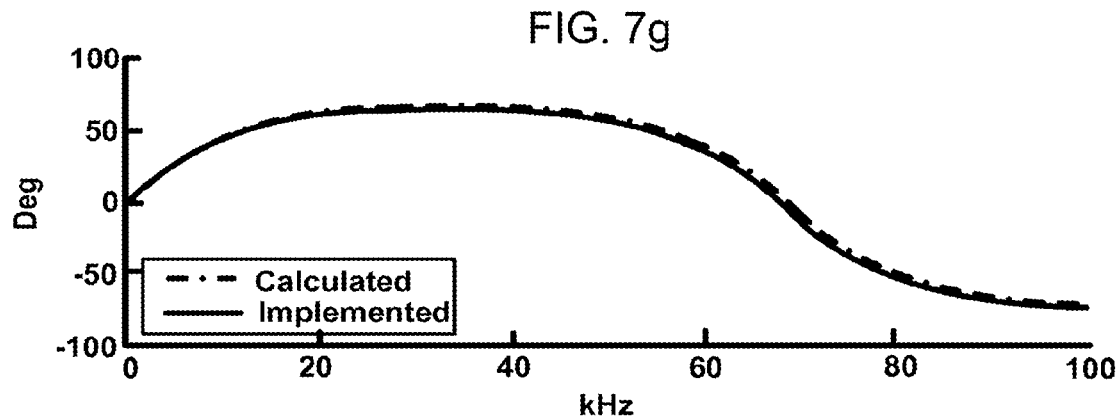
Figure 7H:
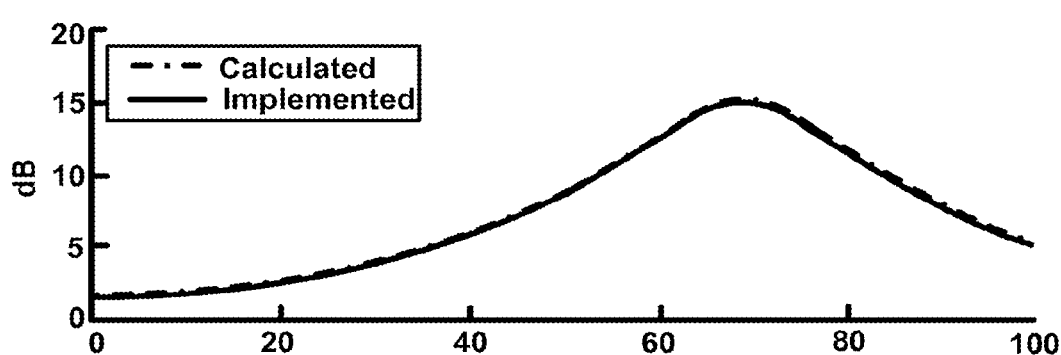
FIGS. 7d and 7h are graphs illustrating a calculated and implemented observer transfer function from tip deflection to tip velocity estimate of the observer of FIG. 6.
Figure 7D:
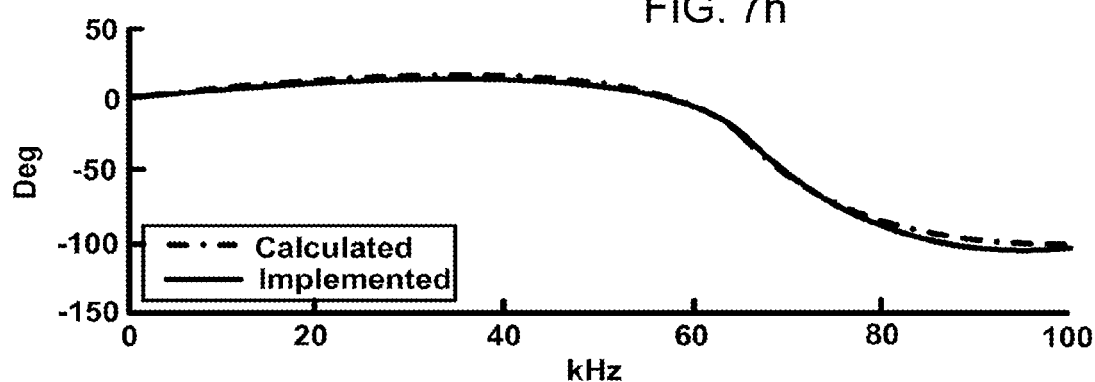

An observer (e.g., a Kalman observer) is designed and implemented as an analog circuit (Tow-Thomas biquad) as shown in FIG. 6. The Kalman observer is a second order transfer function with a right half plane zero from input u and a left half plane zero from input y. A similar circuit (not shown) gives the cantilever-tip position estimate $\hat{p}$. The corresponding calculated and implemented transfer functions from the inputs (dither excitation g and tip deflection y) to outputs (tip position estimate $\hat{p}$ and tip velocity estimate $\hat{v}$) are shown in FIGS. 7a-7h. FIGS. 7a and 7e show the calculated and implemented observer transfer functions from dither excitation g to tip position estimate $\hat{p}$. FIGS. 7b and 7f show the calculated and implemented observer transfer functions from tip deflection y to tip position estimate $\hat{p}$. FIGS. 7c and 7g show the calculated and implemented observer transfer functions from dither excitation g to tip velocity estimate $\hat{v}$. FIGS. 7d and 7h show the calculated and implemented observer transfer functions from tip deflection y to tip velocity estimate $\hat{v}$.

Figure 8:
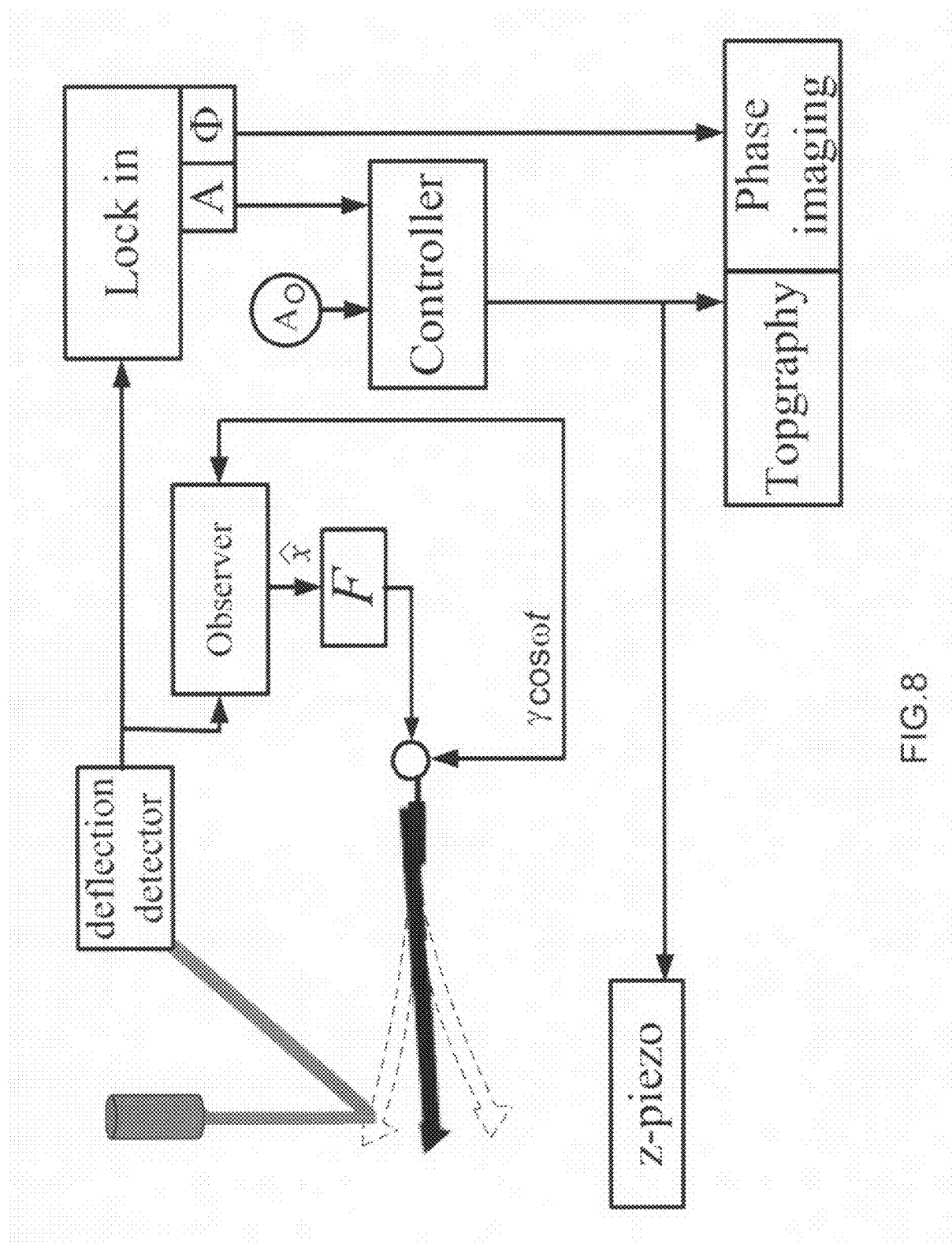
FIG. 8 is an block diagram of a tapping mode AFM set up with an observer in accordance with the teachings of the present invention.

A tapping mode AFM set up with an observer is shown in FIG. 8. This setup is used for various observer based imaging experiments presented herein. The cantilever is excited near its resonance frequency with $g=\gamma\cos\omega t$. A PI controller actuates the vertical piezo to move the sample to maintain a constant set-point amplitude ($A_0$). The observer provides the estimates of the cantilever tip position and velocity. The effective quality factor of the cantilever is regulated by feedback gain F.

Figure 9B:
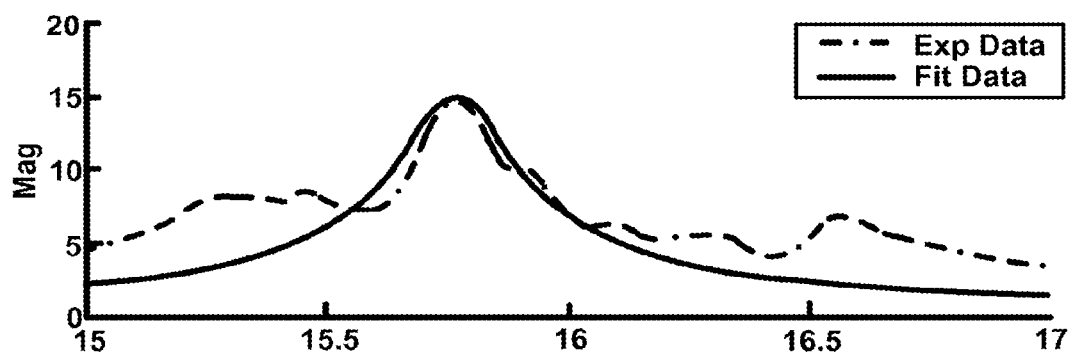
FIGS. 9a and 9b illustrate frequency response of the cantilever in water and the transfer function with the setup shown in FIG. 8.
Figure 9A:
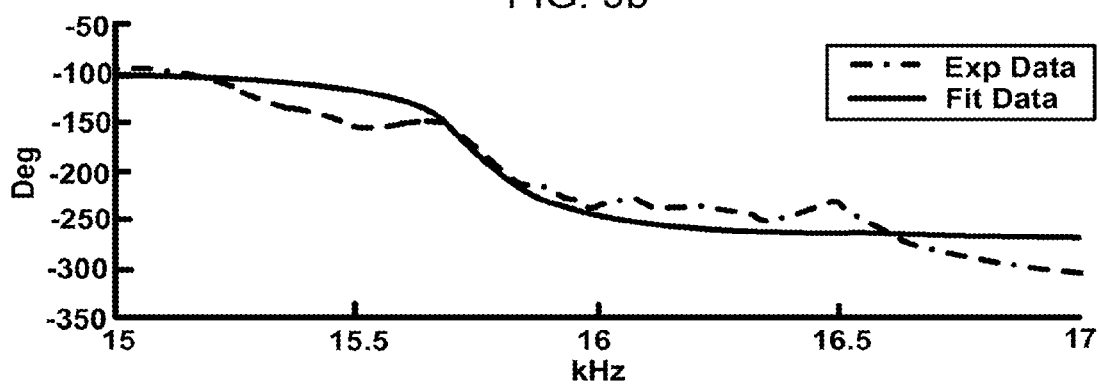
Figure 10B:
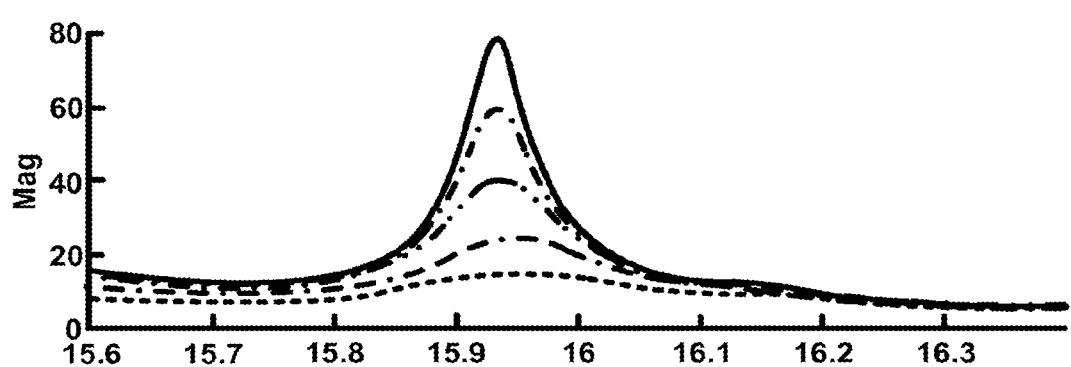
FIGS. 10a and 10b are plots of the frequency response of the setup shown in FIG. 8 when the feedback gain F is increased.
Figure 10A:
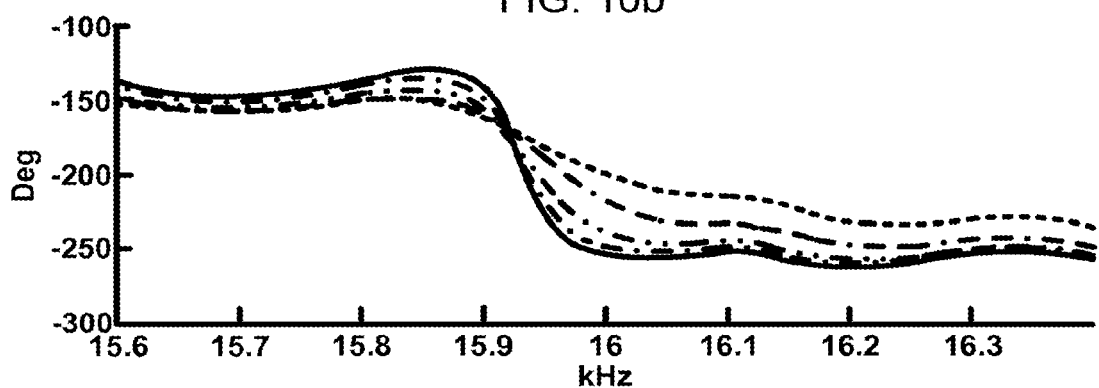

In another experiment, the observer gain F is adjusted with a soft cantilever (Olympus Biolever-B) with resonant frequency $f_0=16$ kHz and quality factor Q=5 and stiffness k=0.005 N/m in water. The frequency response of the AFM shows numerous peaks due to the response of the cantilever to the acoustic excitation due to the surrounding fluid motion. A second order transfer function with a right half plane zero is fit to the frequency response data. The frequency response and the fitted transfer function are shown in FIGS. 9a and 9b. An observer for this system is designed and implemented in an analog circuit. By increasing the observer gain F, quality factor of the cantilever is experimentally increased to 350 under water. Gradual increase in Q by observer based Q-control is shown in FIGS. 10a and 10b.

Figure 11A:
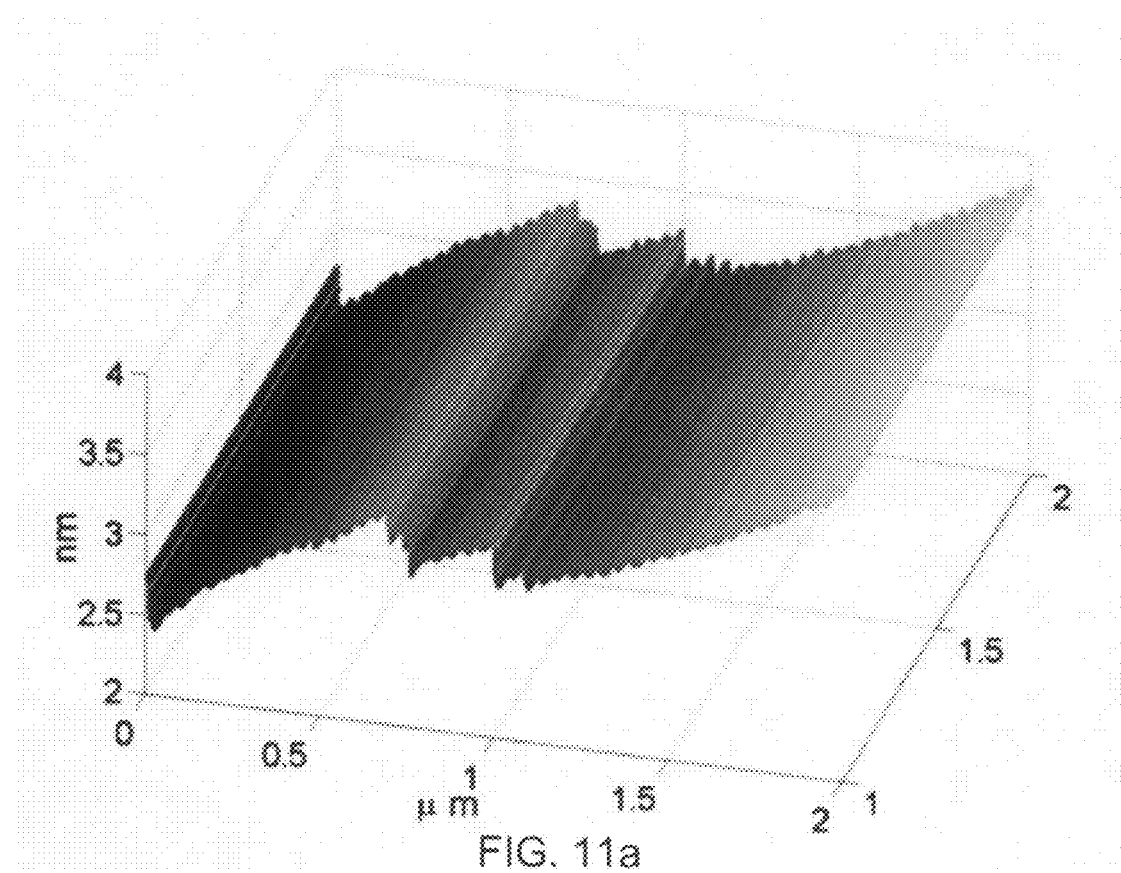
FIG. 11a is an image of a sample using the setup of FIG. 8 at a scan rate of 2 Hz.
Figure 11B:
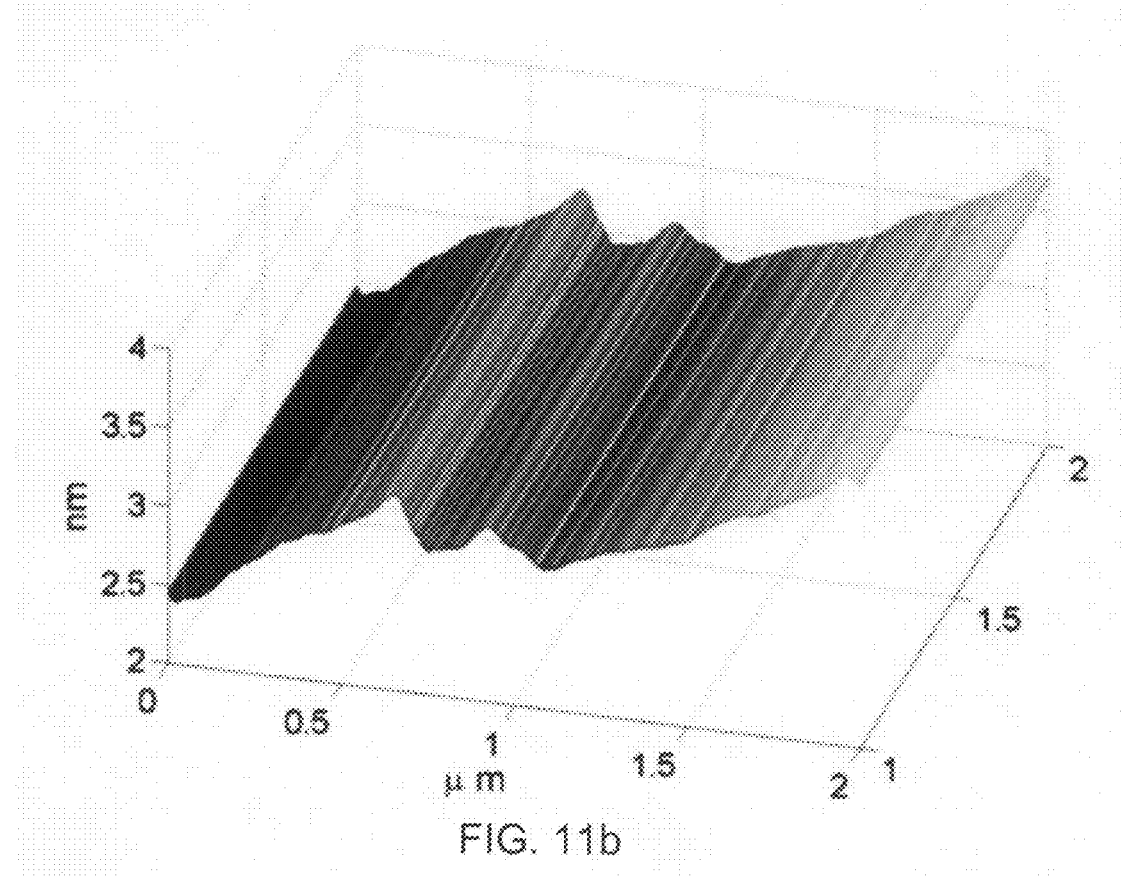
FIG. 11b is an image of the sample of FIG. 11a using the setup of FIG. 8 at a scan rate of 16 Hz.
Figure 11C:
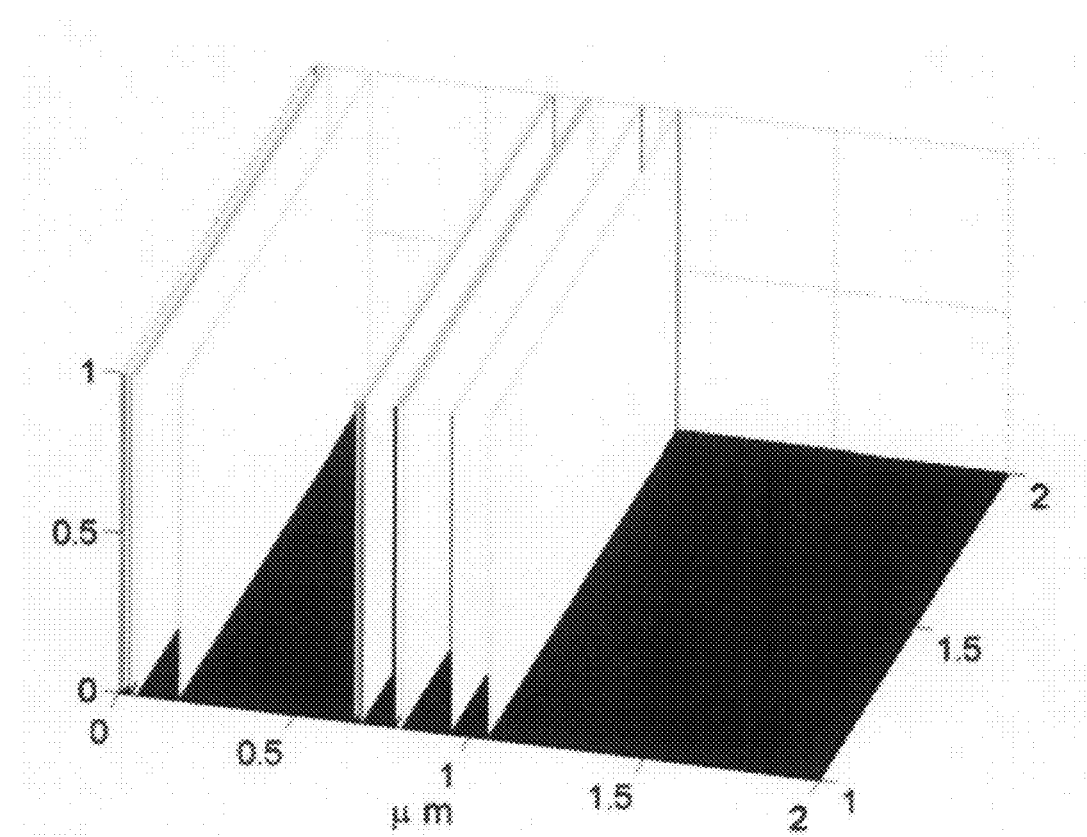
FIG. 11c is an illustration of a decision of sample detection of the sample of FIG. 11a using the setup of FIG. 8 in a transient detection mode at a scan rate of 16 Hz.

In an experiment illustrating imaging with transient detection, a graphite sample was imaged with a set point amplitude $A_0$ equal to 90% of free oscillation amplitude of ≈60 nm with a scan size of 2 μm, proportional and integral gain $k_p=0.2$ and $k_i=0.4$ respectively and at different scan rates. The image of the sample at scan rate of 2 Hz is shown in FIG. 11a. It can be observed that at this scan rate sub-nanometer features (of ≈0.6 nm) of the graphite sample appear with approximately 0.1 μm separation at scan position of 0.75 μm and 1 μm of the image. However the fine features disappear at scan rate of 16 Hz as seen in FIG. 11b. Instead of edges of two layers of graphite on top of one another at the above scan positions, it appears as a smooth layer at higher scan rate. However they are detected by the transient detection method as shown by the decision rule plotted in FIG. 11c.

Figure 12A:
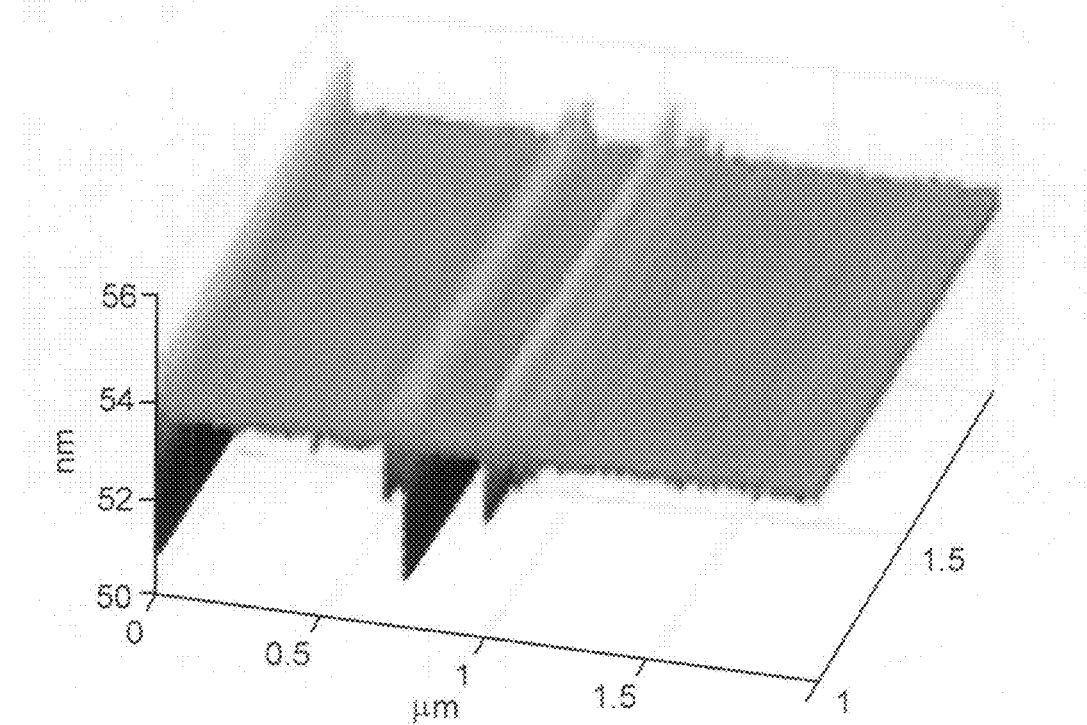
FIG. 12a is an amplitude image of the sample of FIG. 11a at a scan rate of 2 Hz.
Figure 12B:
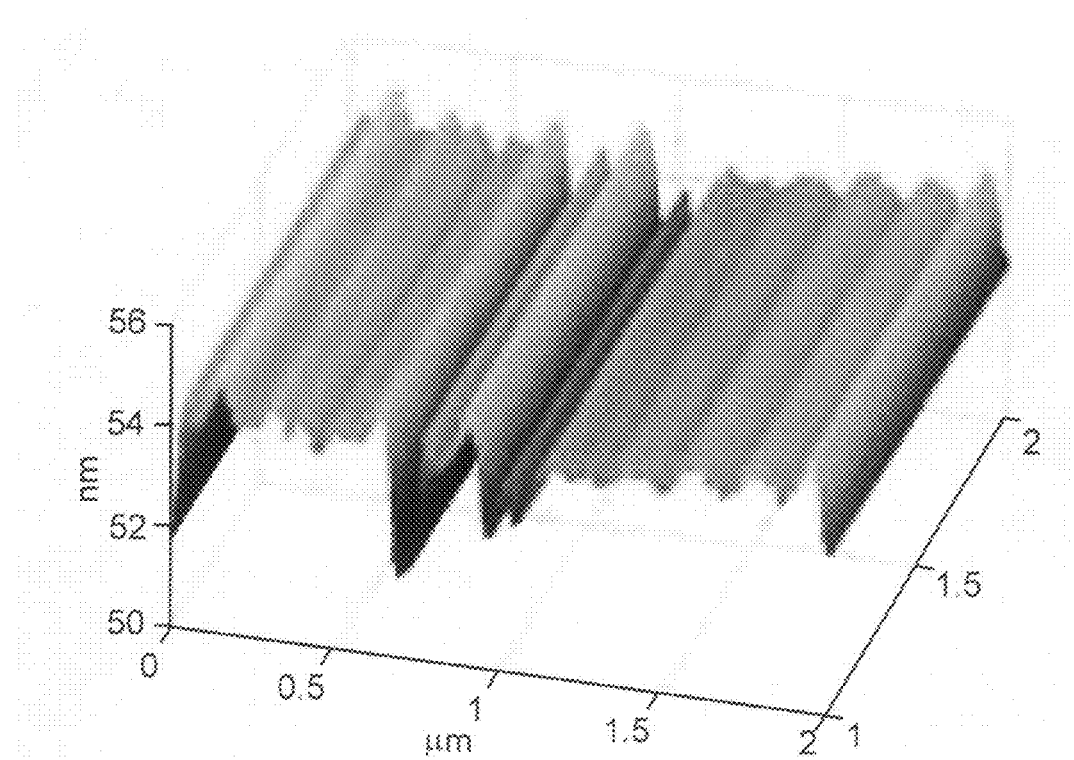
FIG. 12b is an amplitude image of the sample of FIG. 11a at a scan rate of 16 Hz.
Figure 12C:
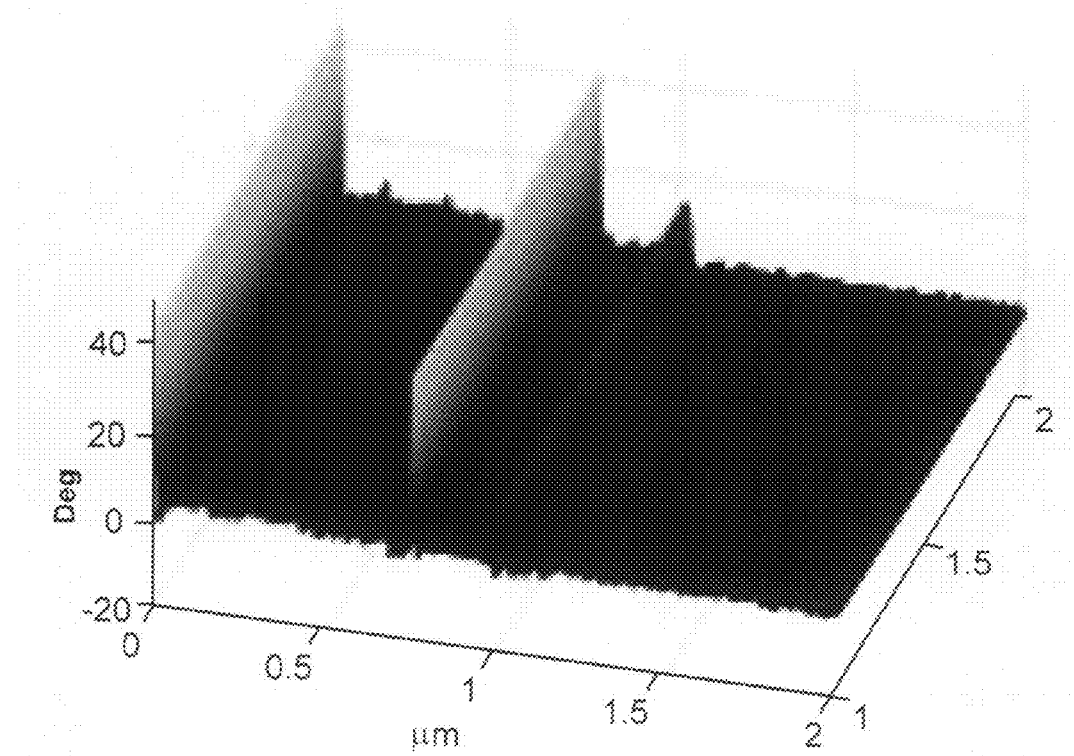
FIG. 12c is a phase image of the sample of FIG. 11a at a scan rate of 2 Hz.
Figure 12D:
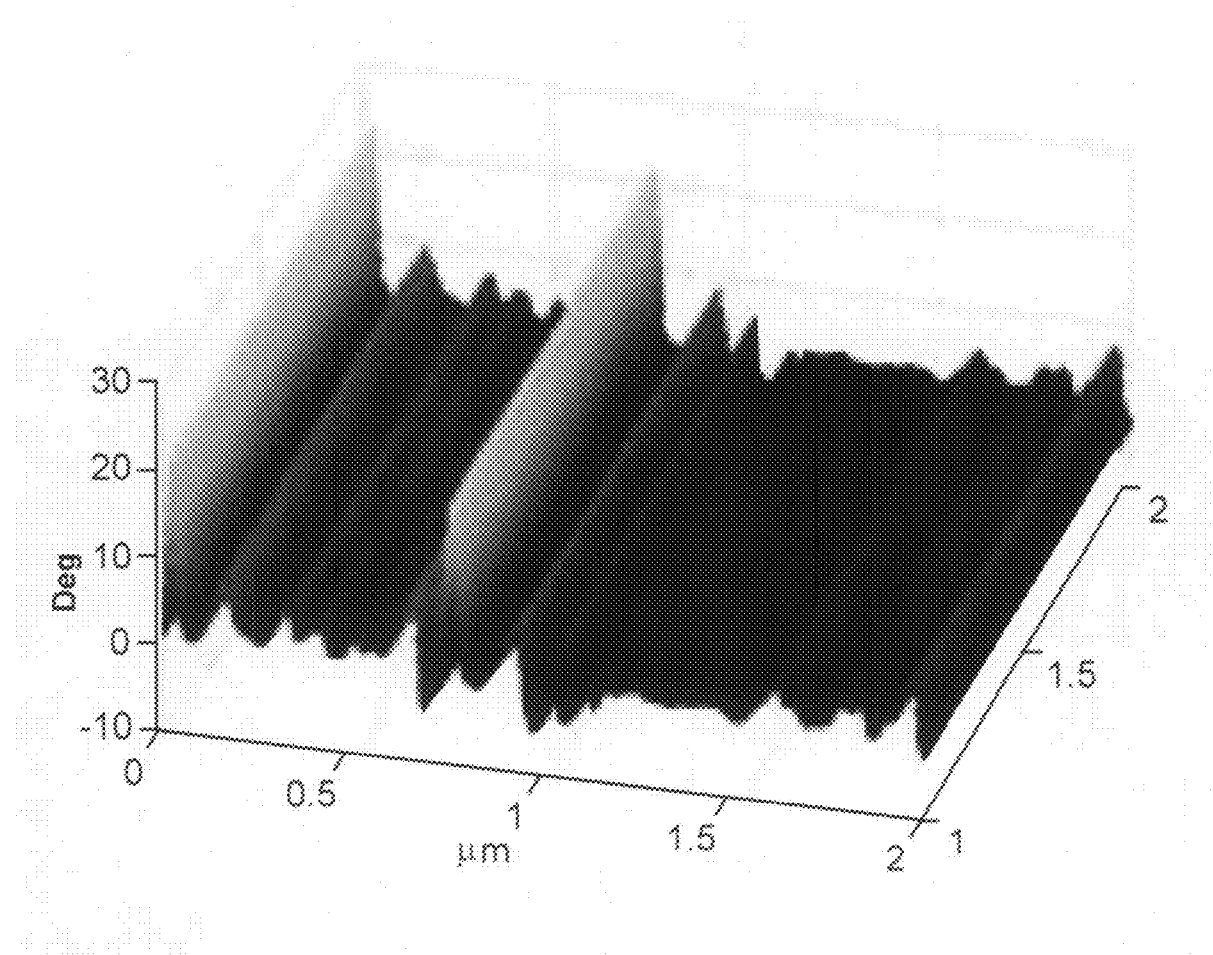
FIG. 12d is a phase image of the sample of FIG. 11a at a scan rate of 16 Hz.

Note that at scan rate of 2 Hz, the closely spaced graphite layers are visible in the amplitude image (FIG. 12a), but not so clearly visible in the phase image (FIG. 12c). However at scan rate of 16 Hz, the graphite layers are not distinguishable in the amplitude and phase image (FIGS. 12b and d respectively). The multiple graphite layers at scan positions of 0.75 μm and 1 μm are successfully detected at a scan rate of 16 Hz using transient detection method when the height, amplitude and phase image failed to construct it. Note that the cantilever is in transience during detection. In the experiment the sample layers in graphite correspond to detection bandwidth of 80 Hz at scan rate of 2 Hz and 640 Hz at scan rate of 16 Hz.

Figure 13A:
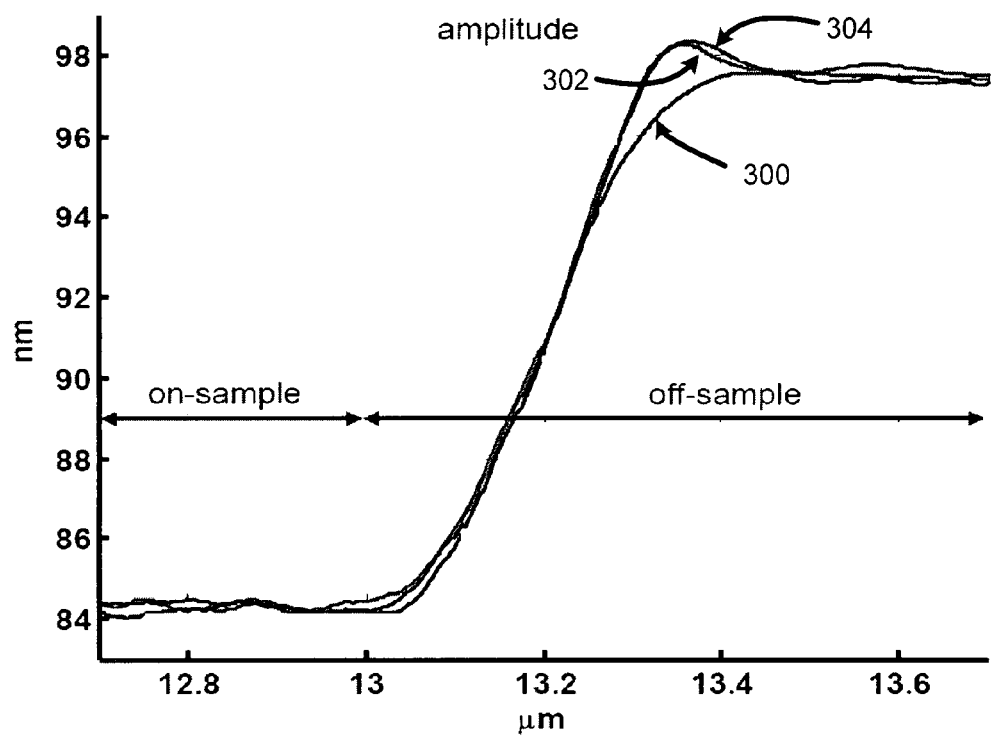
FIG. 13a shows the amplitude of a calibration sample, a conventional method using a phase shifter circuit, and a dual Q method using an analog filter based dual Q control circuit in accordance with the teachings of the invention when a cantilever having a quality factor of 100 is decreased to a factor of 70.
Figure 13B:
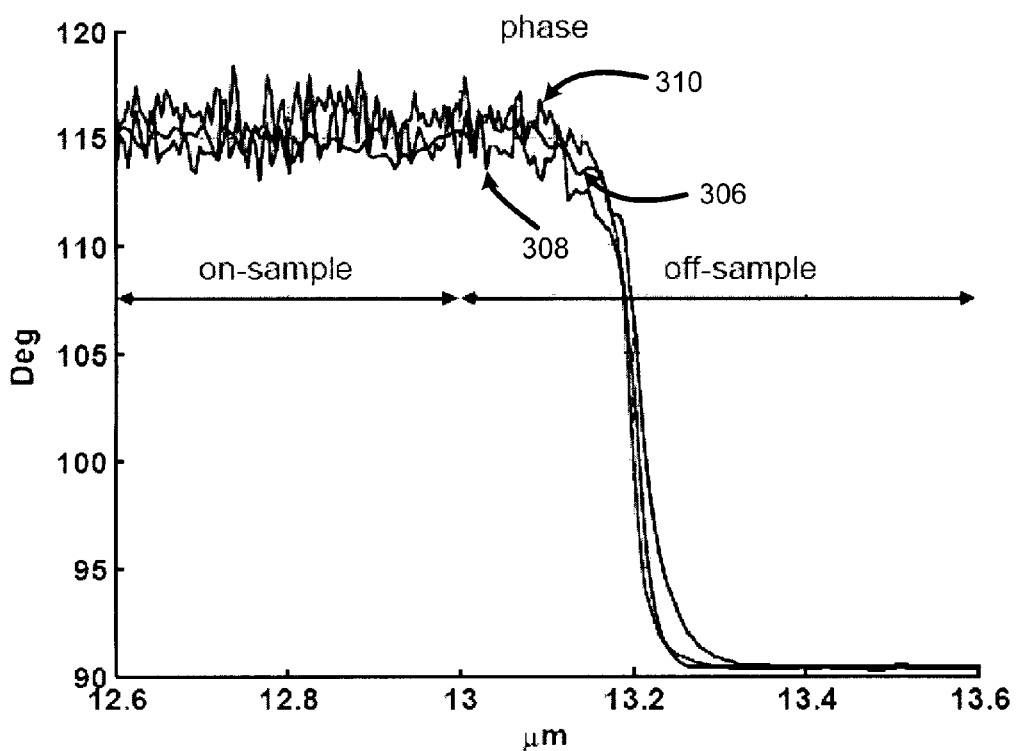

In another experiment, the quality factor of a cantilever having a Q of 100 is decreased to a Q of 70 by an analog filter based dual Q control circuit in accordance with the teachings of the invention and a conventional phase shifter circuit. A calibration sample with 10 nm pit and 10 μm pitch is imaged on Asylum Research MFP3D AFM. The set point amplitude was 84 nm and z-piezo feedback integral gain was 1. The cantilever came off sample at scan position 13 μm and reached its free oscillation amplitude value of 97.5 nm. FIG. 13a shows the amplitude and FIG. 13b shows the phase of the calibration sample, the conventional phase shifter circuit, and the analog filter based dual Q control circuit in accordance with the teachings of the invention. In FIG. 13a, line 300 is the amplitude of the calibration sample, line 302 is the amplitude of the conventional phase shifter circuit and line 304 is the amplitude of the analog filter based dual Q control circuit. In FIG. 13b, line 306 is the phase of the calibration sample, line 308 is the phase of the conventional phase shifter circuit and line 310 is the phase of the analog filter based dual Q control circuit. It can be seen that cantilever damped with the conventional method and with the dual Q control method performed equally while coming off the sample. Therefore the dual Q control achieves equal bandwidth gain as conventional method when the Q of the cantilever is decreased. The benefit of dual Q control is investigated on sample through simulations.

Figure 14A:
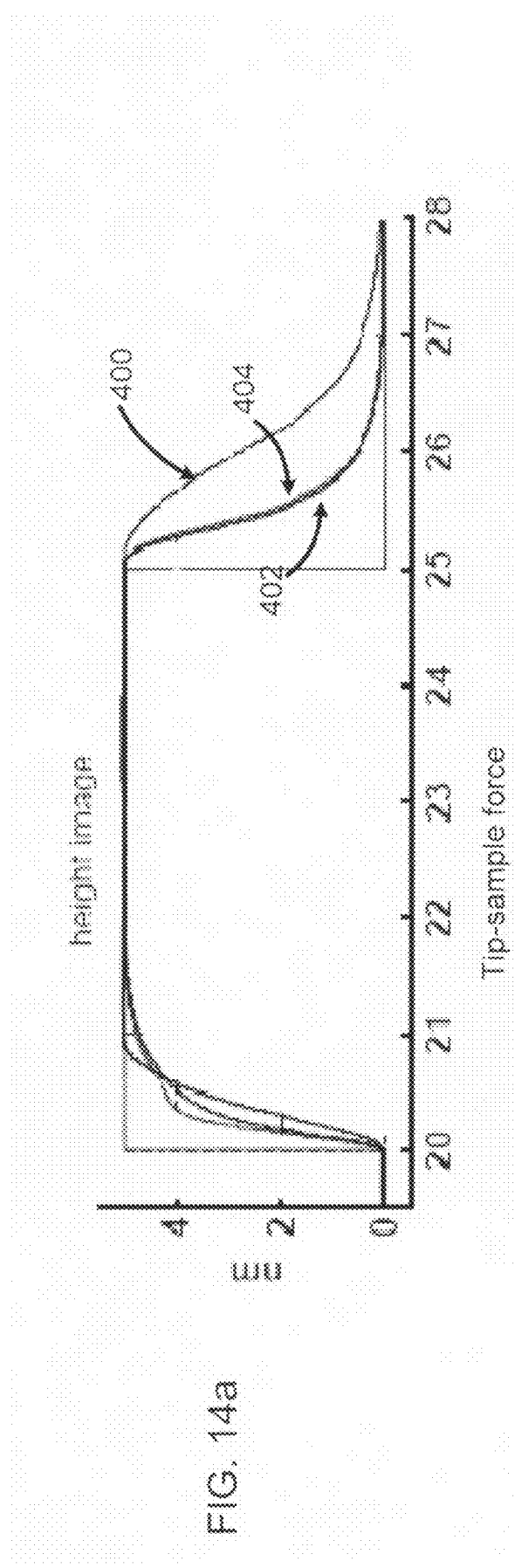
Figure 14B:
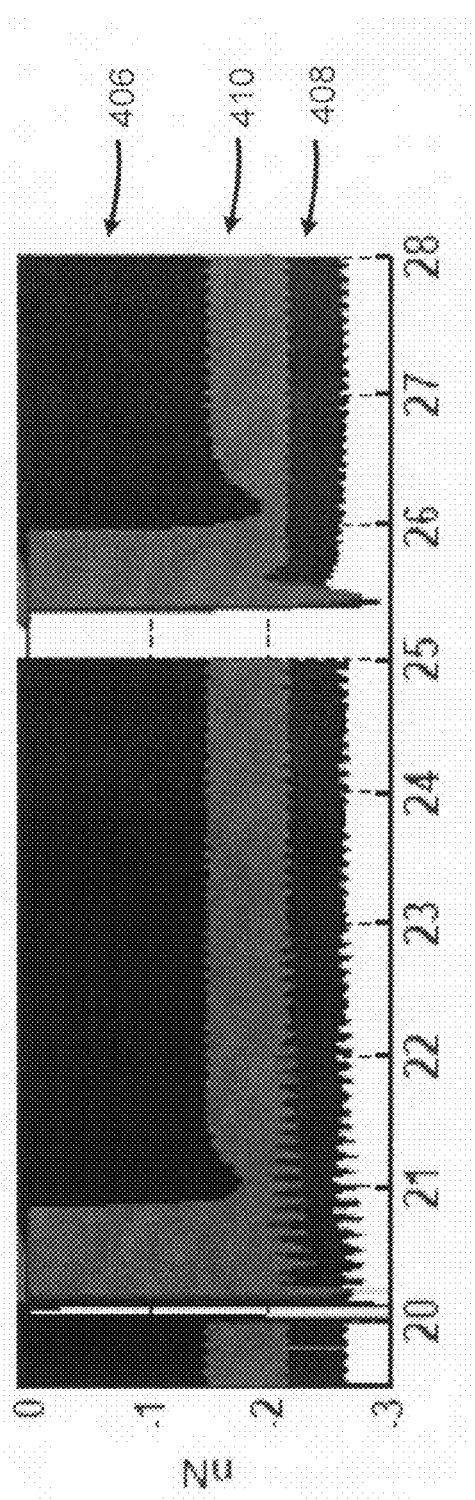

In a simulation, the quality factor of cantilever was decreased from 200 to 20 by both the conventional method and the dual Q method described herein. The resonant frequency of the cantilever was 70 kHz. The cantilever and the z-piezo models were obtained from experimental data. FIG. 14a shows simulation results of the height image of the sample profile and FIG. 14b shows the on sample tip-sample force of the conventional method and the dual Q method. In FIG. 14a, line 400 is a simulation with the Q of 200, line 402 is the simulation result with the conventional method and line 404 is the simulation results with the dual Q method. In FIG. 14b, reference numeral 406 points to the on sample tip-sample force with a Q of 200, reference numeral 408 points to the on sample tip-sample force with the conventional method and reference numeral 410 points to the on sample tip-sample force with the dual Q method. The height image of the sample profile is shown when the cantilever was not damped and when the cantilever was damped with conventional and dual Q control method. Off sample both conventional and dual Q methods perform similar and produce sharper images. However, the on sample tip-sample force is small when dual Q control method is employed. Thus, the dual Q method is gentler on a sample compared to the conventional method.

In another simulation, the quality factor of the cantilever was increased from 10 to 100 by both conventional method and dual Q method. The resonant frequency of the cantilever was 15 kHz. The cantilever and the z-piezo models were obtained from experimental data. FIG. 15a shows simulation results of the height image of the sample profile and FIG. 15b shows the on sample tip-sample force of the conventional method and the dual Q method. In FIG. 15a, line 500 is a simulation with the Q of 10, line 502 is the simulation result with the conventional method and line 504 is the simulation results with the dual Q method. In FIG. 15b, reference numeral 508 points to the on sample tip-sample force with a Q of 100, reference numeral 510 points to the on sample tip-sample force with the conventional method and reference numeral 512 points to the on sample tip-sample force with the dual Q method. The height image of the sample profile (reference numeral 506) is shown when the Q of the cantilever was not increased and when the Q was increased by the conventional method and the dual Q control method. Both the conventional control method and the dual Q control method exert similar on sample tip-sample force on the sample. However, off sample, the height image is sharper when the dual Q control method is employed. Thus, the dual Q control method provides better bandwidth compared to the conventional control method.

The observer based method described herein provides an exact design and performance assessment for active Q control in AFM. The transfer function from dither input to photodiode output is independent of the observer so that the cantilever effectively behaves like a spring-mass-damper system unlike the complex behavior in existing methods. The effective quality factor and stiffness of the cantilever can be changed by appropriately choosing the state feedback gain. In an experiment the value of the Q of a cantilever oscillating in water is enhanced to 350 from a nominal value of 5. The effect of tip-sample interaction force on the bandwidth and resolution during imaging is qualitatively analyzable in this framework. The observer provides flexibility in the state feedback loop to improve the bandwidth or resolution during imaging. It is observed from analysis and observed in the simulation that by appropriately choosing a slower state feedback loop the resolution of imaging can be improved when the cantilever is damped to have a higher bandwidth or the bandwidth of imaging can be improved when the Q is enhanced to have a high resolution. This is remarkable improvement over the existing Q-control methods. The effect of noise on deflection signal is low when the cantilever is damped and the effect is severe when the Q of the cantilever is enhanced. However the noise effect is less on the tip position estimate when a slower state feedback loop is considered. The transient detection scheme is used with observer based Q control method during imaging. The transient detection scheme can be implemented independent of the estimated state feedback loop. In an experiment, the transient detection scheme detected sub-nanometer ($\approx 0.6$ nm) features on a graphite sample spaced $\approx 0.1$ μm apart at two different locations at a scan speed almost an order higher and the features were not distinguishable in the tapping mode images.

With the above understanding, the modeling of the cantilever can be simplified into the first mode approximate model of the cantilever given by:

$$\ddot{p}+2\xi\omega_0\dot{p}+\omega_0^2 p=\eta+w \quad (12)$$

where $\omega_0$, $\xi$, p, η, and w denote the resonant frequency, damping coefficient, tip-deflection, thermal noise, and external force applied to the cantilever, respectively, $w=g+\phi(p)$ where g denotes dither forcing and $\phi(p)$ denotes tip-sample interaction force. Consider a model of AFM derived from its frequency response between dither input and photo-diode output. The transfer function fitting the frequency response data usually has a significant right half-plane zero unlike the model given by Equation 12. The state space representation of AFM model is given by:

$$\dot{\bar{x}}=A\bar{x}+B(\eta+w)$$

$$y=C\bar{x}+v \quad (13)$$

where y and v are photo-diode signal and the measurement noise, respectively. $\bar{x}$ is the state vector that contains cantilever tip-position and velocity and A, B, C are the statespace matrices obtained from frequency response of AFM.

Figure 16:
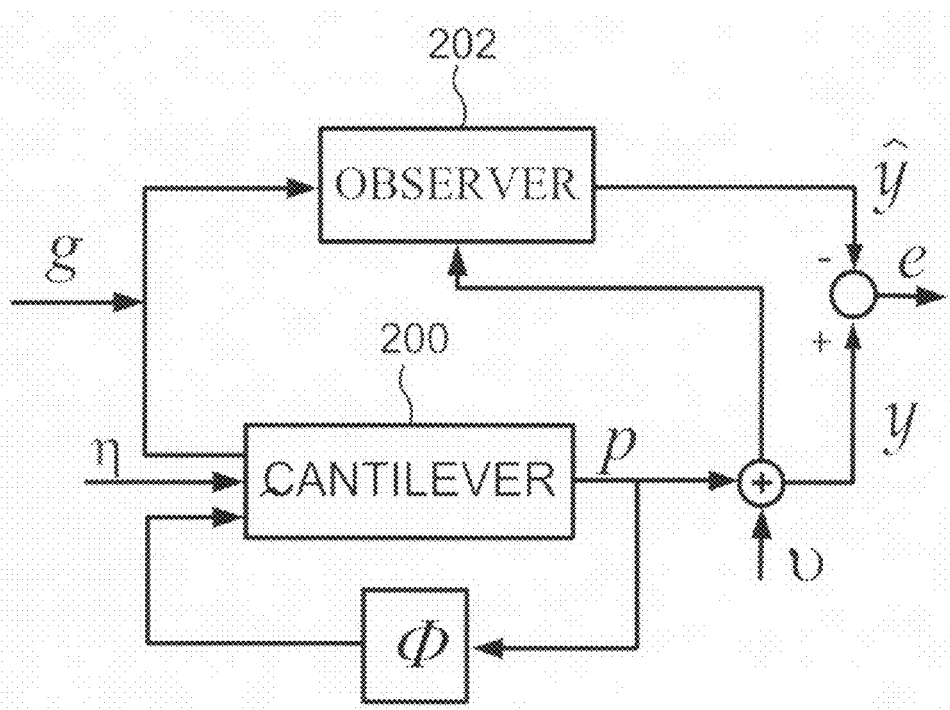
FIG. 16 is a simplified block diagram model of the observer based Q control methodology of FIG. 2.

In the systems viewpoint as previously discussed, the cantilever dynamics is separated as an independent system from the sample subsystem that affects the cantilever in a feedback manner. This systems perspective of the AFM (redrawn in FIG. 16) facilitates the design of an observer that provides an estimate $\hat{\bar{x}}$ of the state $\bar{x}$.

The observer dynamics can then be given by:

$$\dot{\hat{\bar{x}}}=A\hat{\bar{x}}+Bg+L(y-\hat{y}); \hat{\bar{x}}(0)=\hat{\bar{x}}_0$$

$$\hat{y}=C\hat{\bar{x}} \quad (14)$$

where $\hat{\bar{x}}$ is the estimate of the state $\bar{x}$. The error in estimation of state is $\tilde{\bar{x}}=\bar{x}-\hat{\bar{x}}$ and its dynamics is given by:

$$\dot{\tilde{\bar{x}}} = A\bar{x} + B(\omega+\eta) - A\hat{\bar{x}} - Bg - L(y-\hat{y}), \quad (15)$$
$$= (A-LC)\tilde{\bar{x}} + B(\phi+\eta) - L\nu, \quad \tilde{\bar{x}}(0) = \bar{x}(0) - \hat{\bar{x}}(0)$$

The error in the estimate of the output y is given by:

$$e=y-\hat{y}=C\tilde{\bar{x}}+v \quad (16)$$

It is evident that if the observer gain L is chosen so that the eigenvalues of the matrix (A−LC) are in the strict left half complex plane, the state error $\hat{x}$ due to the initial condition mismatch $\hat{x}(0)$ goes to zero with time. The system is observable and therefore the eigenvalues of (A−LC) can be placed anywhere. It can be shown that under the presence of the noise sources η and v, the error process e approaches a zero mean wide sense stationary stochastic process when φ=0. When φ appears due to tip-sample interaction force, the error e loses its zero mean wide sense stationary nature. As a result, the error process provides a good measure of the transients due to tip-sample interaction force on the cantilever.

There is considerable freedom on how fast the observer tracks the cantilever dynamics and consequently how long the effect of tip-sample interaction persists in error signal e. Note that high quality factors are detrimental to high bandwidth in steady state methods; however it is required for high resolution. By utilizing the observer based architecture presented herein, a method for effectively isolating the high bandwidth needs from the high resolution needs is obtained.

The active Q-control is employed to enhance bandwidth or resolution of imaging. Q is increased to increase force sensitivity in order to image with smaller force on the sample. Q is decreased to increase scan speed and capture images with better spatial contrast. The observer provides an estimate of the cantilever tip-velocity which can be used for active Q-control. Thus, the Q-control comes naturally integrated into transient force atomic force microscopy. When Q-control is employed, the standard dither signal is summed with estimated velocity signal F$\hat{x}$ and applied to the cantilever with F being the state feedback gain. F does not affect the effective resonant frequency of the cantilever and changes only the effective Q of the cantilever. Also the transfer function from dither input to photo-diode output is of second order which is equivalent to the unaltered spring-mass damper system with a different damping coefficient. Note that the observer receives the effective dither signal (g+F$\hat{x}$) as one of its inputs and tracks the Q-controlled cantilever response. From the state error dynamics it can be shown that error signal e is independent of feedback gain F. This facilitates analysis of error signal e independent of active Q-control.

The error profile e due to a tip-sample interaction can be better characterized if a model for the effect of the tip sample interaction force on the cantilever-motion is available. We assume that the sample's influence on the cantilever tip is approximated by an impact condition where the position and velocity of the cantilever tip instantaneously assume a new value (equivalent to a state-jump). This is satisfied in most typical operations because in the dynamic mode, the time spent by the tip under the sample's influence is negligible compared to the time it spends outside the sample's influence. The assumption has also been corroborated by experimental results.

Let $v=[v_1,v_2]$ be the state-jump that occurred when the cantilever tip hits the sample surface. Then the error e is given by:

$$e(s) = \frac{\eta(s) + \left(s^2 + \frac{\omega_0}{Q}s + \omega_0^2\right)\nu(s) + \left(s + \frac{\omega_0}{Q}\right)v_1 + v_2}{s^2 + \left(\frac{\omega_0}{Q} + l_1\right)s + \left(\omega_0^2 + l_2 + \frac{\omega_0}{Q}l_1\right)} \quad (17)$$

where $L=[l_1 l_2]^T$ is the observer gain such that $$\left(\frac{\omega_0}{Q} + l_1\right) > 0 \text{ and } \left(\omega_0^2 + \frac{\omega_0}{Q}l_1 + l_2\right) > 0.$$

Note that signal e contains a dynamic response due to state-jump v which is corrupted by thermal and photo-diode noise $\eta$ and $\nu$, respectively.

Transient force atomic force microscopy relies on the error signal e for sample detection and imaging. Lifetime of the signal e is inversely proportional to the speed at which the observer tracks the cantilever response. The bandwidth B of signal e is given by the real parts of eigenvalues of the matrix A–LC. From equation 17, $$B \propto \frac{\omega_0}{Q} + l_1 \quad (18)$$

where $l_1$ is the first component of observer gain $L=[l_1 l_2]^T$

Since the choice of the observer gain L is independent of the quality factor Q, the bandwidth of transient force atomic microscopy is effectively decoupled from the quality factor of the cantilever as previously discussed The dynamic response due to state-jump v is the signal of interest in error process e. Signal to noise ratio (SNR) can be calculated from equation 17 as a function of observer gain L. It can be shown that SNR due to thermal noise $SNR_\eta$ improves if observer gain L is large. This is because when the observer is more aggressive, it also tries to track the thermal noise response of the cantilever and thus reduces thermal noise contribution in error e. From Equation 17 it can be shown that SNR due to measurement noise $SNR_\nu$, and consequently overall SNR, degrades if observer gain L is large. This is because the strength of signal due to state-jump v reduces due to better tracking by the observer and the noise power due to measurement noise $\nu$ practically does not change with large L. Therefore gain L can not be chosen to be arbitrarily large. The bandwidth constraint is mainly imposed by the measurement noise. It is evident that a desired tradeoff between SNR and bandwidth can be obtained by an appropriate choice of L that is independent of Q. This provides considerable flexibility when compared to existing steady state methods where Q determines the bandwidth. Note that due to the small measurement noise, the observer gain L can be chosen large enough so that the cantilever state is tracked within a couple of cycles of the dither forcing. Therefore the optimal bandwidth is primarily dictated by the resonant frequency $\omega_0$ of the cantilever.

With the assumption of the state-jump condition, the effect of tip-sample force on error e can be formulated by considering a discretized model of the cantilever given by, $$x_{k+1}=Fx_k+G(g_k+\eta_k)+\delta_{\theta,k+1}v$$

$$y_k=Hx_k+\nu_k, k\geq 0 \quad (19)$$

where matrices F, G, and H are obtained from matrices A, B and C by discretizing the continuous time model described by equation 2 above and simplified to be $$\dot{\bar{x}}=A\bar{x}+B(\eta+\omega)$$

$$y=Cx+\nu \quad (20)$$

$\delta_{i,j}$ denotes the dirac delta function defined as $\delta_{i,j}=1$ if i=j and $\delta_{i,j}=0$ if i≠j. $\theta$ denotes the time instant when the tip-sample interaction occurs and v signifies the state-jump during the impact.

The thermal noise $\eta$ and measurement noise $\nu$ are assumed to be white and uncorrelated. The optimal observer is a Kalman filter and shall be used in the following description. Other types of observers may be used. When the Kalman observer is employed the error e is known as the innovation signal which is a zero mean white process when tip-sample interaction forcing $\phi=0$.

The innovation sequence $\{e_k\}$ can be written as, $$e_k=\Upsilon_{k;\theta}v+\gamma_k$$

$$\Upsilon_{k;\theta}=H(F-L_KH)^{k-\theta} \quad (21)$$

where $\{\Upsilon_{k;\theta}v\}$ is a known dynamic profile with unknown arrival time $\theta$ and magnitude v. $\{\gamma_k\}$ is the white noise component in $\{e_k\}$ and $L_K$ is the steady state Kalman observer gain.

The transient force atomic microscopy based sample detection scheme relies on detection of dynamic profile $\Upsilon$ in innovation sequence $\{e_k\}$. This problem is formulated in the framework of binary hypothesis testing given by, $$H_0: e_k=\gamma_k, k=1,2,\ldots,M \text{ versus } H_1: e_k=\Upsilon_{k;\theta}v+\gamma_k$$
$$k=1,2,\ldots,M \quad (22)$$

where the innovation sequence $\{e_k\}$ is windowed into M samples for detecting dynamic profile $\Upsilon$.

To select between the two hypotheses, a likelihood ratio test is computed as, $$l(M) = \frac{\bar{e}^T \bar{s}^T}{V} = \frac{\bar{e}^T \Upsilon}{V}\left(\frac{\Upsilon^T \Upsilon}{V}\right)^{-1} \frac{\Upsilon^T \bar{e}}{V} \quad (23)$$

where $\bar{e}=[e_1, e_2, \ldots, e_M]^T$, $\Upsilon=[H, H(F-L_KH), \ldots, (F-L_KH)^{M-1}]^T$, V is a covariance matrix, and $E\{\gamma_i\gamma_k^T\}=V\delta_{ij}$. The likelihood ratio l(M) is compared with a threshold value $\epsilon$ as $l(M)_{<H_0}^{>H_1}\epsilon$ to arrive at a decision whether the dynamic profile is present or not (which is equivalent to detecting tip sample interaction). The threshold $\epsilon$ is chosen so that the false alarm rate $P_F$ is small and detection probability $P_D$ is high.

For real-time implementation of transient force atomic microscopy based imaging the likelihood ratio calculation can be simplified as a true-power detection algorithm given by, $$r(M) = \frac{\bar{e}^T \bar{e}^T}{V} \quad (24)$$

Though using a true-power of innovation signal is at least one order less sensitive than using a likelihood ratio, it is easy to implement and gives high quality imaging results for practical samples as can be seen in the following description.

The results of using the methods described above using transient force atomic microscopy shall be presented next with capturing images of DNA samples using high speed, high resolution transient force atomic microscopy at scan speeds more than 100 µm/sec using commercial atomic force microscopes.

In the following experiment a multi-mode AFM (from Digital Instruments), a freshly cleaved graphite (HOPG) sample, and a cantilever with resonant frequency $f_0=60.25$ kHz and quality factor Q=104 were used.

The z-piezo dynamics was used to generate small time scale sample profiles to demonstrate high speed sample detection. When a voltage pulse of 1 volt peak-to-peak, frequency 1 kHz and duty ratio 50% was applied, the z-piezo pulsated to generate a sample profile with 4 peaks separated by approximately 100 µs with average width and height of each peak approximately 25 µs and 20 nm, respectively.

Thermal and measurement noise powers were obtained experimentally from the photo-diode signal when the cantilever was freely oscillating in air and when it was held stiff against graphite surface. A Kalman observer was designed and implemented based on a (1st mode model of cantilever) 2nd order transfer function fit to the frequency response between dither input and photo-diode output of the atomic force microscope setup.

In the experiment, the above mentioned voltage pulse was applied to the z-piezo, the cantilever was tuned to oscillate near its resonant frequency and then brought close to the sample. The stepper motor of the atomic force microscope was used for coarse approach and a dc offset applied to the z-piezo was used for fine approach. The innovation signal from analog observer was monitored on oscilloscope to detect tip-sample interaction. The innovation signal was captured and the likelihood ratio was calculated based on the dynamic profiles of 2nd order approximation of the atomic force microscope model.

Figure 17A:
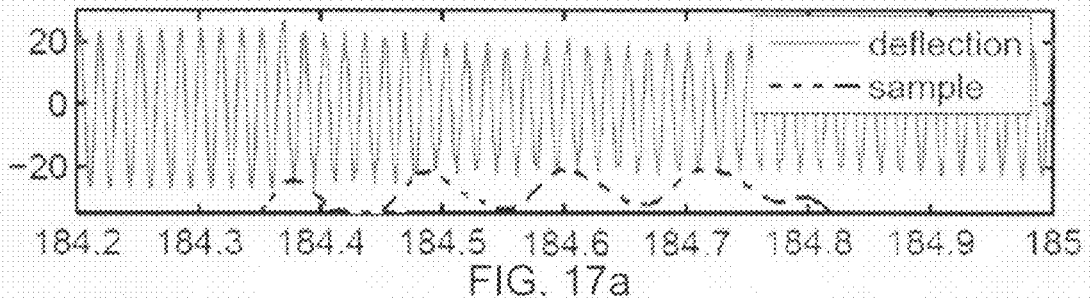
FIG. 17a is a graph showing cantilever deflection plotted above a sample profile.
Figure 17B:
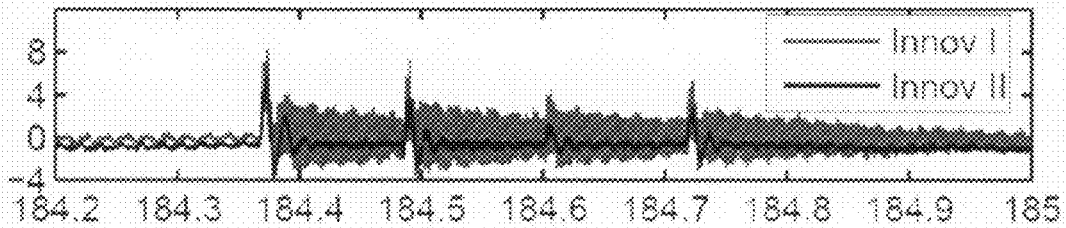
FIG. 17b is a graph illustrating innovation signals from a $2^{nd}$ order observer (shown in gray) and a $4^{th}$ order observer (shown in black)
Figure 17C:
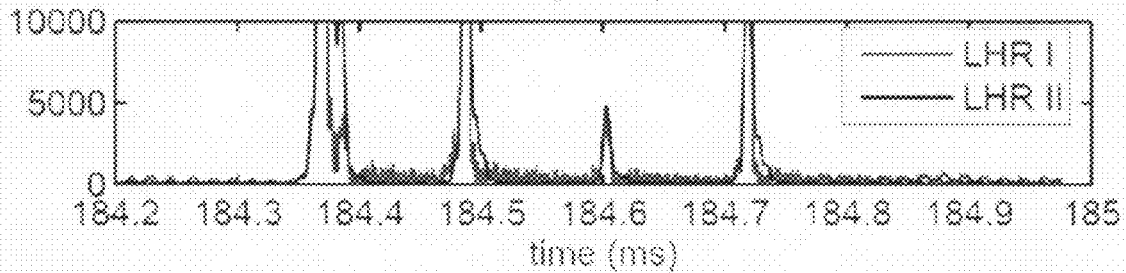
FIG. 17c is a graph illustrating likelihood ratios calculated from the innovation signals of FIG. 17b using $1^{st}$ mode dynamic profiles.

The sample profile, deflection signal, innovation signal (Innov I) and likelihood ratio (LHR I) are shown in FIGS. 17a-17c. Note that the tip hitting the four peaks in the sample profile are detected using the innovation signal and the likelihood ratio using a threshold that can detect a 0.25 nm peak in the sample profile with more than 99% detection probability and less than 1% false alarm rate. This demonstrates the high resolution and high speed detection of sample using the methods described herein. Note that the cantilever is in transient state through out the experiment. It is beyond the bandwidth of amplitude and phase signals to detect the peaks in the sample profile. This experiment demonstrates a sample detection rate of 10 kHz (equivalent to 10 kbits per second) using a 60.25 kHz cantilever. Assuming the dynamic profiles can be captured and detected within 4 cycles of cantilever oscillation, the achievable detection bandwidth is $$\frac{f_0}{4}$$

using a cantilever with resonant frequency $f_0$. Note that use of steady state signals limits detection bandwidth to $$\frac{f_0}{Q}$$

where Q is in the range of 100-200.

Further, the deflection and dither signals were captured and innovation signal corresponding to a 4th order model of AFM (2nd mode model of cantilever) was obtained. The likelihood ratio was calculated based on 1st mode dynamic profiles. These signals are shown in FIGS. 17b-17c as Innov II and LHR II, respectively. It can be argued that 2nd mode oscillations of the cantilever are present in Innov I and 2nd mode dynamic profiles are captured in Innov II. Note that the likelihood ratios calculated from Innov I and Innov II based on the 1st mode dynamic profiles look similar and the 4 peaks in the sample profile can be detected with equal level of performance. This concludes that a 1st mode implementation of observer is sufficient for high speed and high resolution detection of sample.

The sample preparation shall be described followed by the experimental test setup. Lambda DNA solution (Catalog #D1501 from Promega Corporation) of 500 µg/ml concentration was diluted to 50 µg/ml concentration using Tris/HCl/EDTA buffer (10 mM Tris/HCl, 1 mM EDTA, pH 6.6-6.8). This solution was used as the stock solution. Working solution was prepared from it by diluting it to 1 µg/ml using $NiCl_2$ buffer (40 mM HEPES, 5 mM $NiCl_2$, pH 6.6-6.8). DNA sample for imaging in air was prepared by incubating 20 µl of working solution on a freshly cleaved mica surface for 10 minutes. Then mica surface was rinsed with pure water and dried using nitrogen gas.

Figure 18:
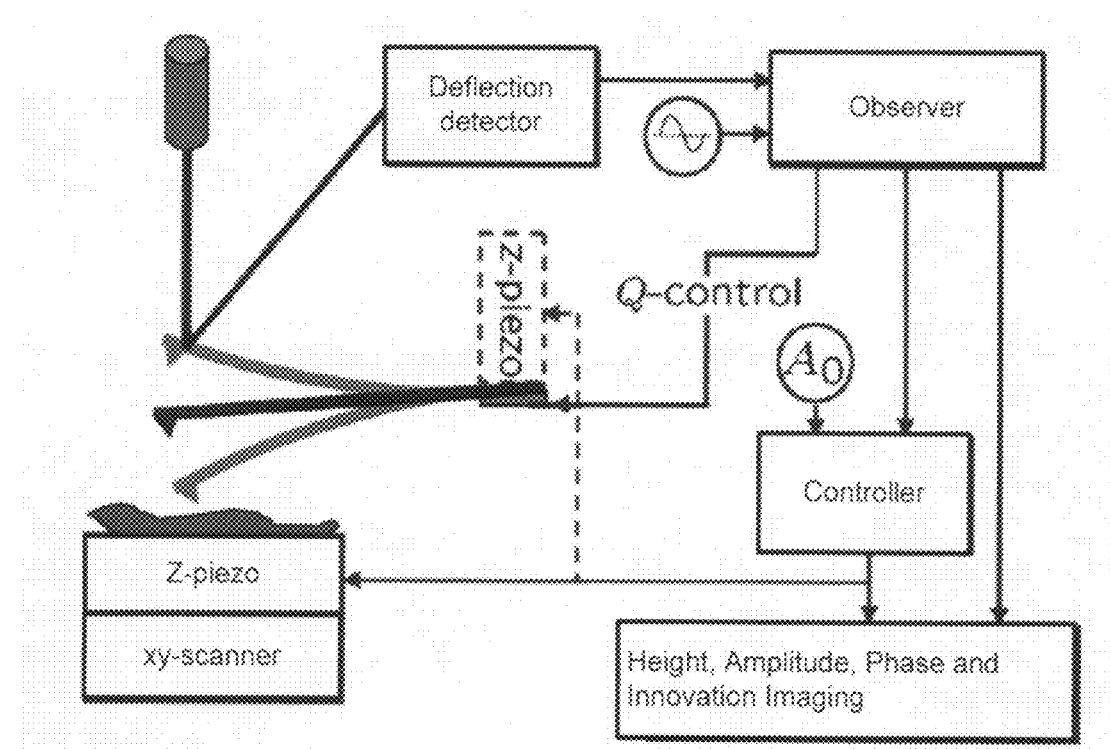
FIG. 18 is a block diagram of a conventional AFM set up with an observer to detect height, amplitude, phase, and innovation of a sample.

In the set-up, a commercial AFM was used with an electronic add-on that implements the observer as shown in FIG. 18. In the setup, a field programmable gate array (FPGA) (XILINX VIRTEX 2-PRO XV30) was used to implement a digital version of the observer. The innovation signal from the FPGA is fed to a true power detector circuit (AD8361 from Analog Devices) and the output is connected to the auxiliary input of the AFM setup. Images are then captured by imaging the signal at the auxiliary channel using existing AFM operating software. Amplitude modulated (AM) and transient force AFM images can be captured in parallel. For active Q-control, the velocity estimate signal from the digital observer on FPGA is added to the standard dither signal and applied to the cantilever.

Figure 19:
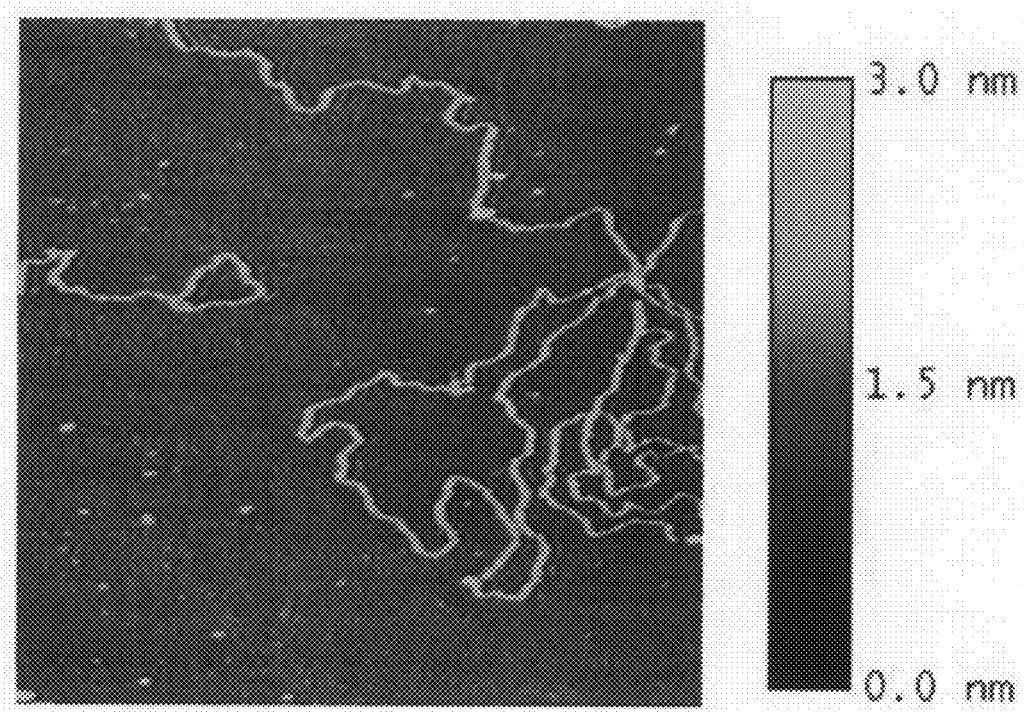
FIG. 19 is a reference image of a DNA sample used as a reference to compare transient force atomic microscopy obtained images of the DNA sample.

An AM-AFM height image of Λ-DNA captured at a scan speed of 4 µm/sec is shown in FIG. 19. The average height of DNA in the image is 1.5 nm. Typically DNA images are taken at lower scan speed, for example a scan size of 1 µm and scan rate of 1 Hz. The DNA image shown in FIG. 19 is taken as a reference image to assess the transient force AFM based DNA images captured at various scan speeds.

The transient force AFM needs tuning of scan parameters like set point amplitude, scan size and feedback gains to capture high quality images. In high-speed imaging, the right selection of scan parameters can reduce wear and tear of tip and sample significantly. Scan parameters tuned for AM- AFM imaging could be different from parameters chosen for high-speed transient force AFM imaging.

In the experiment, first the set point amplitude of cantilever was kept close to free oscillation amplitude. Then it was slowly reduced until images appeared. Z-piezo feedback gains after tuning were integral gain $k_i=0.5$ and proportional gain $k_p=1$. The scan speed was slowly increased in steps and corresponding height, amplitude, phase and transient force AFM images were collected.

Figure 20A:
FIG. 20a is an image of the height of the DNA sample of FIG. 19 acquired using the amplitude modulation method in accordance with the teachings of the invention at a scan speed of 97.68 μm/sec.
Figure 20B:
FIG. 20b is an image of the phase of the DNA sample of FIG. 19 acquired using the amplitude modulation method in accordance with the teachings of the invention at a scan speed of 97.68 μm/sec.
Figure 20C:
FIG. 20c is an image of the amplitude of the DNA sample of FIG. 19 acquired using the amplitude modulation method in accordance with the teachings of the invention at a scan speed of 97.68 μm/sec.
Figure 20D:
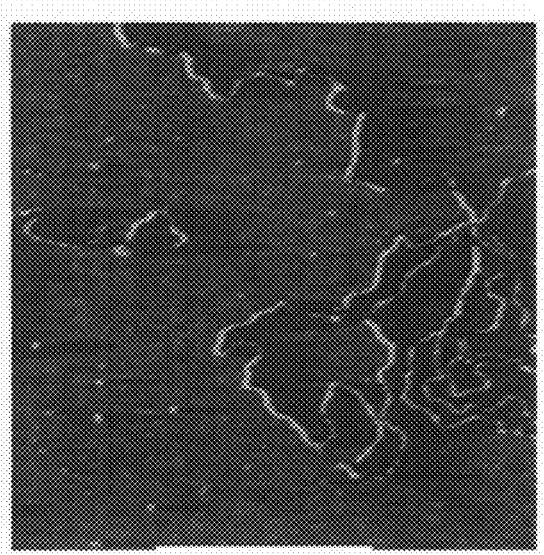
FIG. 20d is an image of the DNA sample of FIG. 19 acquired using the transient force method in accordance with the teachings of the invention at a scan speed of 97.68 µm/sec.
Figure 21A:
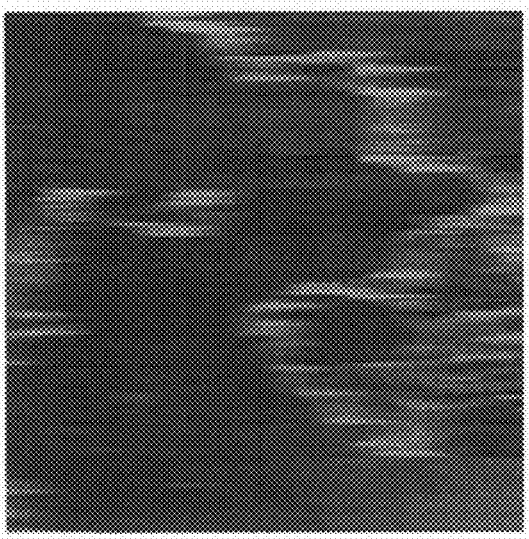
FIG. 21a is an image of the height of the DNA sample of FIG. 19 acquired using the amplitude modulation method in accordance with the teachings of the invention at a scan speed of 162.8 µm/sec.
Figure 21B:
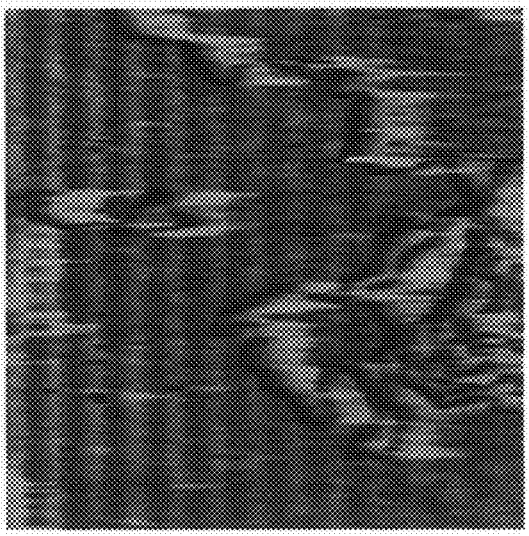
FIG. 21b is an image of the phase of the DNA sample of FIG. 19 acquired using the amplitude modulation method in accordance with the teachings of the invention at a scan speed of 162.8 µm/sec.
Figure 21C:
FIG. 21c is an image of the amplitude of the DNA sample of FIG. 19 acquired using the amplitude modulation method in accordance with the teachings of the invention at a scan speed of 162.8 µm/sec.
Figure 21D:
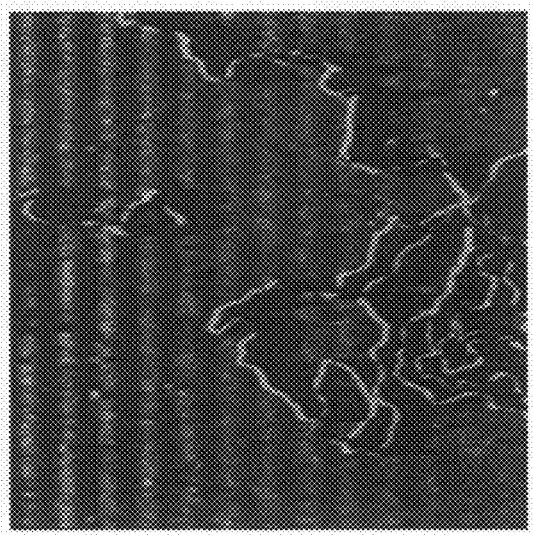
FIG. 21d is an image of the DNA sample of FIG. 19 acquired using the transient force method in accordance with the teachings of the invention at a scan speed of 162.8 µm/sec.

DNA height, phase, amplitude and transient force AFM images collected at scan speed of 97.68 µm/sec are shown in FIGS. 20a-20d. Compared to reference height image shown in FIG. 19, the height image taken at 97.68 µm/sec (see FIG. 20a) appears very blurred. This can be attributed to small closed loop bandwidth of AFM setup and high bandwidth content of the height signal due to fast varying spatial profile of DNA. The phase and amplitude images taken at 97.68 µm/sec are also blurred (see FIGS. 20b and c). This can be attributed to the high quality factor of cantilever. The transient force AFM image of DNA taken at 97.68 µm/sec as shown in FIG. 20d provides a high quality image of DNA and corresponds well to the reference image shown in FIG. 19.

Note that in FIG. 19, there are very small specs present on the mica sample with similar height feature as the long DNA strand. These specs are very blurred and not captured distinctively in height, phase and amplitude images taken at 97.68 µm/sec (see FIGS. 20 a, b, and c). The transient force AFM image distinctively captures these small specs spite of high speed (see FIG. 20d).

In the experiment, scan rate was further increased to 162.8 µm/sec keeping the same scan size and scan parameters values. Corresponding height, amplitude, phase and transient force AFM images are shown in FIGS. 21a-21d. It can be seen that the quality of AM-AFM images i.e. height, phase and amplitude images deteriorated further. Referring to height image taken at 4 µm/sec in FIG. 19, the transient force AFM image shown in FIG. 21d still captures the DNA and the small specs on the mica surface distinctively. Note that the vertical streaks in the images shown in FIGS. 21a-21d are due to oscillations in the xyz-scanner, which were not tuned for high scan speed experiments. During raster scanning, when the fast axis scanner takes the sharp turn at the edge of the scan area, it rings which is coupled to z-piezo creating artificial sample features. Designs and methods to eliminate such high frequency oscillations at a given scan speed is being investigated.

The effect of active Q-control on transient force AFM shall now be discussed. In this experiment, an AFM (MFP3D) from Asylum Research is utilized. In MFP3D, the z-scanner is mechanically decoupled from the xy-scanners. At high scan speeds this can avoid unwanted oscillations in the z-scanner due to limited bandwidth of xy-scanners (see FIGS. 20a-20d). However, oscillations in the z scanner can still appear due to amplitude feedback since the amplitude oscillates for a long time due to high quality factor of the cantilever.

Figure 22B:
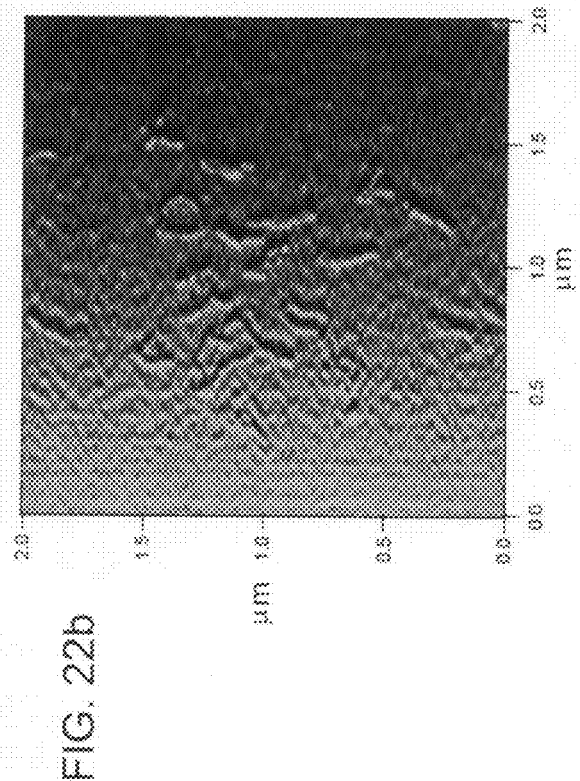
FIG. 22b is an image of plasmid DNA acquired using the transient force atomic microscopy method with a cantilever quality factor of Q=104 at a scan speed of 97.655 µm/sec using active Q control.
Figure 22D:
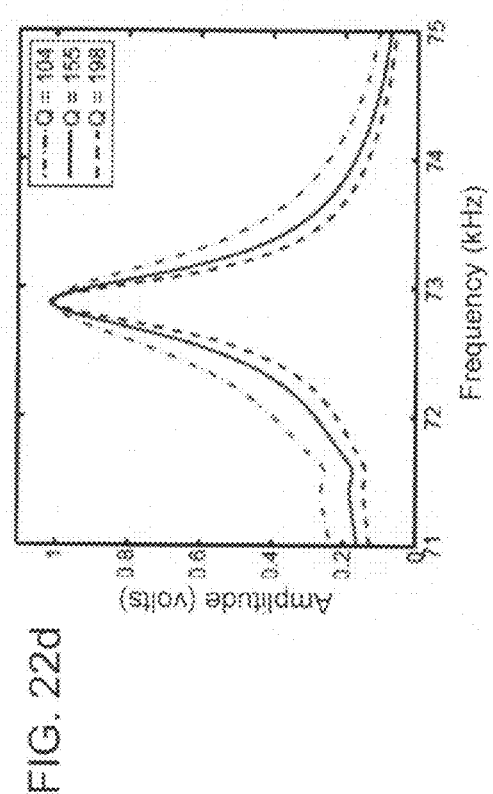
FIG. 22d is a graph illustrating amplitude versus frequency of the set up used in FIGS. 22a-22c for a cantilever quality factor of Q=155, Q=104, and Q=198.
Figure 22A:
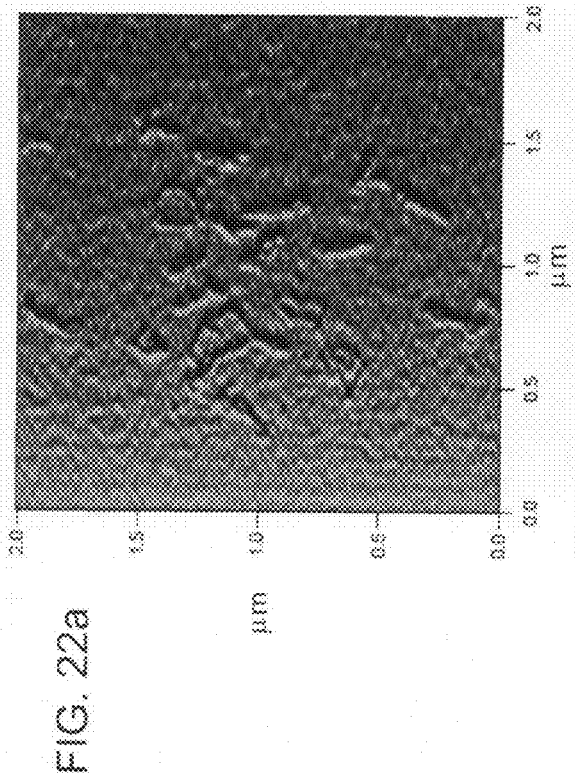
FIG. 22a is an image of plasmid DNA acquired using the transient force atomic microscopy method with a cantilever quality factor of Q=155 at a scan speed of 97.655 µm/sec using active Q control.
Figure 22C:
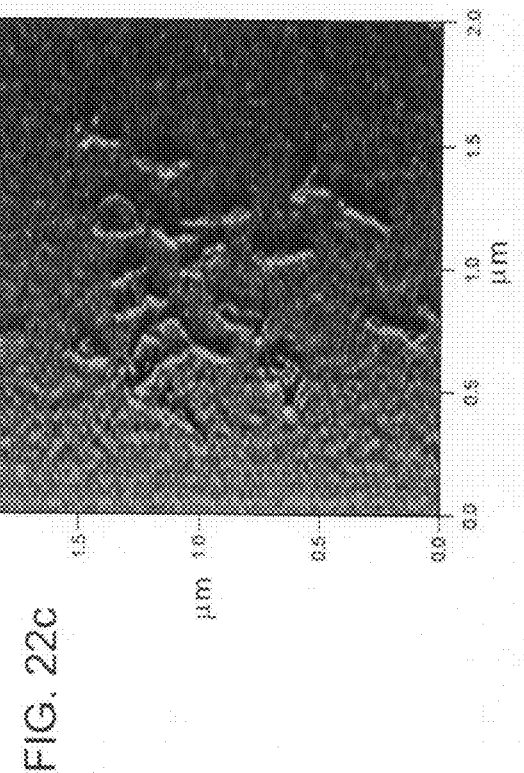
FIG. 22c is an image of plasmid DNA acquired using the transient force atomic microscopy method with a cantilever quality factor of Q=198 at a scan speed of 97.655 µm/sec using active Q control.

The DNA sample was prepared using Plasmid DNA (pUC19 from Bayou Biolabs) following the same protocol described earlier. Transient force AFM images of the DNA sample are captured in air with various scan parameters and Q values. In FIGS. 22a, b, and c, transient force AFM images are shown for Q=155 (nominal), Q=198 and Q=104, respectively (see FIG. 22d) with scan size equal to 2 µm and scan speed equal to 97.655 µm/sec. Spatial contrast in the transient force AFM images remained same for different values of Q. This can be attributed to the fact that transient force AFM is largely independent of quality factor of the cantilever. When the Q value was increased from 155 to 198, the image looked neater because the cantilever was interacting mildly with the sample surface giving rise to less transient signals: When Q value was decreased from 155 to 104, the cantilever was interacting relatively harsher with the sample surface giving rise to more transient signals and correspondingly more background noise in the image. Due to larger tip-sample force DNA is distorted in several parts of the image in FIG. 22c when Q was decreased. It can be concluded that high speed transient force AFM imaging with active Q-increase is suitable for imaging soft biological samples as it provides high quality images while being softer on the sample.

Note that current AFM schemes utilize the steady-state part of cantilever response. Transient force AFM has been an effort to exploit the transient-state part of cantilever response in order to develop an ultra-fast sample interrogation method. The experiments described herein have shown significant promise for improving both resolution and bandwidth of imaging.

From the foregoing it can be seen that transient force AFM can provide high-speed, high resolution sample-imaging. A model based framework for high speed high resolution imaging has been described where the cantilever and its interaction with the sample are modeled. Transient force AFM is seamlessly integrated into commercially available AFMs by incorporating a FPGA and the like implementing a digital observer. The true power of innovation signal is used at the auxiliary input of AFM and high speed transient force AFM images can be captured along with AM-AFM images. The high speed and high resolution imaging capabilities of transient force AFM is demonstrated by imaging DNA with a height of 1.5 nm at a scan speed of 162.8 µm/sec. Transient force F-AFM integrates active Q control by using the cantilever tip velocity signal from the observer.

Spatial contrast in transient force AFM images is independent of quality factor. However, when the quality factor of the cantilever is increased, the background noise in the image is less and better transient force AFM images are obtained. A new methodology for imaging at the nanoscale has been disclosed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method to perform high-speed high resolution imaging of a sample from detecting transient cantilever movement in an atomic force microscope, the cantilever having a tip, the method comprising the steps of:
   receiving an input dither signal and tip deflection data corresponding to the input dither signal;
   generating an innovation signal based upon the input dither signal and tip deflection data, the innovation signal having a dynamic profile of unknown arrival time and unknown magnitude with additive white noise;
   computing maximum likelihood estimates of the arrival time and magnitude using a likelihood ratio test;
   deriving an image of the sample using the maximum likelihood estimates of the arrival time and magnitude; and
   wherein the likelihood ratio test is in accordance with $$r(M) = \frac{\bar{e}^T \bar{e}^T}{V}$$

where V is a covariance matrix, $\bar{e}=[e_1, e_2, \ldots, e_M]^T$, and e is an error in an estimate of the output of an observer.

2. The method of claim 1 wherein the step of generating the innovation signal comprises the step of generating the innovation signal according to $$e(s) = \frac{\eta(s) + \left(s^2 + \frac{\omega_0}{Q}s + \omega_0^2\right)v(s) + \left(s + \frac{\omega_0}{Q}\right)v_1 + v_2}{s^2 + \left(\frac{\omega_0}{Q} + l_1\right)s + \left(\omega_0^2 + l_2 + \frac{\omega_0}{Q}l_1\right)}$$

where $L=[l_1 l_2]^T$ is an observer gain such that $$\left(\frac{\omega_0}{Q} + l_1\right) > 0$$

and $$\left(\omega_0^2 + \frac{\omega_0}{Q}l_1 + l_2\right) > 0,$$

$\omega_0$ is the resonant frequency, v is measurement noise, $\eta$ is thermal noise, Q is the quality factor and $v=[v_1, v_2]$ is a state-jump that occurs when the cantilever tip hits the sample surface.

3. The method of claim 1 further comprising the step of comparing a likelihood ratio from the likelihood ratio test to a threshold value to arrive at a decision whether the dynamic profile is present.

4. The method of claim 3 wherein the threshold value is chosen such that a false alarm rate is below a predefined level.

5. The method of claim 3 wherein the threshold value is chosen such that a detection probability is above a predefined level.

6. A method to perform transient imaging of a sample from detecting transient cantilever movement in an atomic force microscope using Q control, the cantilever having a tip, the method comprising the steps of:
   receiving an input dither signal and tip deflection data corresponding to the input dither signal;
   generating an estimated position and an estimate velocity of the tip;
   generating an innovation signal based upon the input dither signal, the tip deflection data, the estimated position and the estimated velocity, the innovation signal having a dynamic profile of unknown arrival time and unknown magnitude with additive white noise;
   computing maximum likelihood estimates of the arrival time and magnitude using a likelihood ratio test;
   deriving an image of the sample using the maximum likelihood estimates of the arrival time and magnitude; and
   further comprising the step of adding the estimated position and the estimate velocity in a feedback loop to add to the input dither signal, thereby actively damping a quality factor ("Q") of the cantilever.

7. The method of claim 6 further comprising the step of comparing a likelihood ratio from the likelihood ratio test to a threshold value to arrive at a decision whether the dynamic profile is present.

8. The method of claim 7 wherein the threshold value is chosen such that a false alarm rate is below a predefined level.

9. The method of claim 7 wherein the threshold value is chosen such that a detection probability is above a predefined level.

10. A method to perform transient imaging of a sample from detecting transient cantilever movement in an atomic force microscope using Q control, the cantilever having a tip, the method comprising the steps of:
    receiving an input dither signal and tip deflection data corresponding to the input dither signal;
    generating an estimated position and an estimate velocity of the tip;
    generating an innovation signal based upon the input dither signal, the tip deflection data, the estimated position and the estimated velocity, the innovation signal having a dynamic profile of unknown arrival time and unknown magnitude with additive white noise;
    computing maximum likelihood estimates of the arrival time and magnitude using a likelihood ratio test;
    deriving an image of the sample using the maximum likelihood estimates of the arrival time and magnitude; and
    further comprising the step of adding the estimated position and the estimate velocity in a feedback loop to add to the input dither signal, thereby actively enhancing a quality factor ("Q") of the cantilever.

11. A method to perform transient imaging of a sample from detecting transient cantilever movement in an atomic force microscope using Q control, the cantilever having a tip, the method comprising the steps of:
- receiving an input dither signal and tip deflection data corresponding to the input signal;
- generating an estimated position and an estimate velocity of the tip;
- generating an innovation signal based upon the input dither signal, the tip deflection data, the estimated position and the estimated velocity, the innovation signal having a dynamic profile of unknown arrival time and unknown magnitude with additive white noise;
- computing maximum likelihood estimates of the arrival time and magnitude using a likelihood ratio test;
- deriving an image of the sample using the maximum likelihood estimates of the arrival time and magnitude;
- wherein the step of generating an estimated position and an estimate velocity comprises the step of generating an estimated position and an estimate velocity using an observer; and
- wherein dynamics of the observer are given in accordance with:

$$\dot{\hat{x}} = A\hat{x} + Bu + L(y - C\hat{x}); \hat{x}(0) = \hat{x}_0$$

$$u = (g + F\hat{x})$$

$$\hat{p} = C\hat{x}$$

$$\hat{v} = D\hat{x}$$

where $\hat{x}$ is the estimate dynamic state of the cantilever, L is the observer gain, F is the state feedback gain, g is the input dither signal, $\hat{p}$ is the estimate position, A, B, C, and D are state matrices realized from the frequency response from a dither-piezo input to a photo-diode output, u is the dither-piezo input, y is the photo-diode output, and $\hat{v}$ is the estimated velocity.

12. The method of claim 11 wherein a transfer function from dither input to photo-diode output is independent of the observer.

13. The method of claim 11 wherein the state feedback gain F does not affect the effective resonant frequency of the cantilever.

* * * * *